(12) United States Patent
Sakakibara

(10) Patent No.: US 9,893,329 B2
(45) Date of Patent: Feb. 13, 2018

(54) ELECTRONIC POWER SUPPLY DEVICE

(71) Applicant: MAKITA CORPORATION, Anjo-shi (JP)

(72) Inventor: Kazuyuki Sakakibara, Okazaki (JP)

(73) Assignee: MAKITA CORPORATION, Anjo-Shi (JP)

( * ) Notice: Subject to any disclaimer, the term of this patent is extended or adjusted under 35 U.S.C. 154(b) by 48 days.

(21) Appl. No.: 14/747,106

(22) Filed: Jun. 23, 2015

(65) Prior Publication Data
US 2016/0006005 A1    Jan. 7, 2016

(30) Foreign Application Priority Data

Jul. 4, 2014 (JP) ................................ 2014-138611
Jul. 4, 2014 (JP) ................................ 2014-138613

(51) Int. Cl.
| | |
|---|---|
| *H01M 2/10* | (2006.01) |
| *H01M 10/65* | (2014.01) |
| *H01M 2/34* | (2006.01) |
| *H01M 10/42* | (2006.01) |
| *H01M 10/6554* | (2014.01) |
| *H01M 2/20* | (2006.01) |

(52) U.S. Cl.
CPC ....... *H01M 2/1022* (2013.01); *H01M 2/1094* (2013.01); *H01M 2/34* (2013.01); *H01M 10/4257* (2013.01); *H01M 10/65* (2015.04); *H01M 10/6554* (2015.04); *H01M 2/204* (2013.01); *H01M 2200/00* (2013.01); *H01M 2220/30* (2013.01)

(58) Field of Classification Search
CPC ........................ H01M 2/1077; H01M 10/0422
See application file for complete search history.

(56) References Cited

U.S. PATENT DOCUMENTS 5,432,017 A * 7/1995 Hassemer ............... B29C 65/08
                                                                                 29/623.4
2003/0096160 A1    5/2003 Sugiura et al.
2007/0134981 A1 * 6/2007 Shinoda ............... H05K 5/0047
                                                                              439/587

(Continued)

FOREIGN PATENT DOCUMENTS

| JP | H08504053 A | 4/1996 |
|---|---|---|
| JP | 2000188091 A | 7/2000 |

(Continued)

OTHER PUBLICATIONS

Office Action from the Japanese Patent Office dated Nov. 21, 2017 in counterpart Japanese application No. 2014-138611, and machine translation thereof.

(Continued)

*Primary Examiner* — Olatunji Godo
(74) *Attorney, Agent, or Firm* — J-Tek Law PLLC; Jeffrey D. Tekanic; Scott T. Wakeman

(57) ABSTRACT

An electronic power supply device supplies electric power from a plurality of battery cells to an electronic power equipment and has an inner case for housing the plurality of battery cells and an outer case for housing the inner case. The electronic power supply device is designed to protect the plurality of battery cells from water damage and from an impact in the event that the electronic power supply device is accidentally dropped.

21 Claims, 24 Drawing Sheets

(56) References Cited

U.S. PATENT DOCUMENTS

| | | |
|---|---|---|
| 2008/0241649 A1 | 10/2008 | Kohri et al. |
| 2010/0156350 A1* | 6/2010 | Murayama .......... H01M 2/1022 320/128 |
| 2011/0198103 A1* | 8/2011 | Suzuki ..................... B25F 5/00 173/46 |
| 2013/0136956 A1 | 5/2013 | Nakano et al. |
| 2014/0295257 A1 | 10/2014 | Harada |
| 2014/0302376 A1 | 10/2014 | Naito |

FOREIGN PATENT DOCUMENTS

| | | |
|---|---|---|
| JP | 2005197192 A | 7/2005 |
| JP | 2005317460 A | 11/2005 |
| JP | 2007200580 A | 8/2007 |
| JP | 2008066001 A | 3/2008 |
| JP | 2008091220 A | 4/2008 |
| JP | 2008251454 A | 10/2008 |
| JP | 2009277504 A | 11/2009 |
| JP | 2010146879 A | 7/2010 |
| JP | 2010277795 A | 12/2010 |
| JP | 2011216304 A | 10/2011 |
| JP | 2012009277 A | 1/2012 |
| JP | 2012209174 | 10/2012 |
| JP | 2013070504 A | 4/2013 |
| JP | 2013114779 A | 6/2013 |
| JP | 2014197515 A | 10/2014 |
| JP | 2014203661 A | 10/2014 |
| WO | 9508848 A1 | 3/1995 |

OTHER PUBLICATIONS

Office Action from the Japanese Patent Office dated Nov. 21, 2017 in counterpart Japanese application No. 2014-138613, and machine translation thereof.

* cited by examiner

ELECTRONIC POWER SUPPLY DEVICE

CROSS-REFERENCE

This application claims priority to Japanese patent application serial number 2014-138611 and Japanese patent application serial number 2014-138613, both filed on Jul. 4, 2014, the contents of which are incorporated herein by reference in their entireties.

TECHNICAL FIELD

The present invention generally relates to an electronic power supply device capable of supplying electric power stored in a plurality of battery cells to an electronic power equipment, such as, e.g., a power tool or outdoor power equipment.

BACKGROUND ART

Japanese Laid-Open Patent Application No. 2011-216304 discloses an electronic power supply device configured to supply electric power stored in battery cells to an electronic power equipment, such as electric pruning clippers and electric hedge clippers. As shown in FIG. 31, this known electronic power supply device includes an electronic power supply pack 100 made of cloth which can be carried on the operator's back. Furthermore, a battery pack 102 having a plurality of battery cells, a mounting unit 104 configured to be slidably mounted onto the battery pack 102, and a controller 105 are housed in the electronic power supply pack 100. An output connector 106, to which a power cord (not shown) of the electric pruning clippers etc. is connected, may be located in the controller 105. According to this configuration, electric power stored in the battery pack 102 can be supplied to the electric pruning clippers, etc. while the power cord of the electric pruning clippers, etc. is connected to the output connector 106 of the controller 105.

The above-described electronic power supply device is configured to house the battery pack 102 in the electronic power supply pack 100 that is made of cloth. As described above, the battery pack 102 may be configured to be slidably mounted onto the mounting unit 104. Accordingly, the battery pack 102 may include a slit-shaped opening, into which an electric power supply terminal such as the mounting unit 104 is insertable. The battery pack 102 may also include ventilation openings, through which air supplied by a charger (not shown) can pass to cool the battery pack 102, for example, while it is being charged by the charger. However, such ventilation openings may adversely affect the water tightness of the battery pack 102 that houses the battery cells. In addition, the electronic power supply pack 100 in which the battery pack 102 is housed may be formed of cloth that is water resistant but is not entirely waterproof, and thus it may be difficult to adequately protect the cells in the electronic power supply device from damage caused by the ingress of water/moisture. As a result, the battery cells in the battery pack 102 may become wet, and the reliability or durability of the cells may be reduced, e.g., due to electrolytic corrosion.

Furthermore, because the electronic power supply pack 100 is made of cloth, the cloth may not sufficiently absorb a shock or impact if the electronic power supply device is, for example, accidentally dropped, such that the battery pack 102 and the battery cells could be subjected to a significant impact in this event. In case the battery pack 102 houses multiple battery cells, the battery pack will be quite heavy and thus will potentially suffer from a substantial shock if dropped. The resulting damage may cause a malfunction.

In view of the above, there is a need to provide improved water protection for the battery cells of an electronic power supply device and also to protect the cells from impact damage by more effectively absorbing, dissipating and/or deflecting the impact energy if the electronic power supply device is dropped.

SUMMARY

Generally speaking, the present disclosure concerns techniques for improving the water tightness and/or impact absorbing ability of an electronic power supply device configured to supply electric power from a plurality of battery cells to an electronic power equipment, such as but not limited to a power tool or outdoor power equipment. The electronic power supply device may generally comprise an inner case for housing the plurality of battery cells and an outer case for housing the inner case.

In one exemplary embodiment of the present disclosure, the inner case may have a structure that makes it waterproof or substantially waterproof, and the cells may be housed in the inner case. The inner case, in turn, may be housed in the outer case, which may further protect the cells of the electronic power device from the ingress of water/moisture. In view of this waterproof design, the electronic power supply device may be used outdoors regardless of the weather, e.g., even if it is raining. As used herein, "waterproof" refers to a structure that prevents or impedes the entry/ingress of water when the electronic power supply device is used outside in rainy or snowy conditions, but "waterproof" is not intended to mean that the electronic power supply device can prevent the ingress water if it is submerged in water.

In another exemplary embodiment of the disclosure, the inner case may have an inner case main body with an opening and an inner case cover that covers the opening of the inner case main body. Furthermore, the outer case may have an outer case main body with an opening and an outer case cover that covers the opening of the outer case main body.

In another exemplary embodiment of the disclosure, the inner case main body may be housed in the outer case main body such that an (the) opening of the inner case main body faces in the same direction as an (the) opening of the outer case main body. Furthermore, a mating (alignment) position of the inner case main body with the inner case cover (e.g., a seam or junction between the inner case main body and the inner case cover) preferably matches or is aligned with a mating (alignment) position of the outer case main body with the outer case cover in a depth direction of the device (that is, the seam or junction between the inner case main body and the inner case cover preferably may lie in the same plane, or in substantially the same plane, as the seam or junction between the outer case main body and the outer case cover), or a mating (alignment) position of the inner case main body with the inner case cover may be positioned inside the outer case cover (that is, in a different plane than the seam or junction between of the outer case main body and the outer case cover). Because of this double structure in terms of the mating (alignment) positions, that is, because of the offset locations of the junctions between the respective bodies and their covers, even if water enters into the outer case through (from or via) the mating position of the outer case, such water may not easily fall onto (reach) the mating position of the inner case.

In another exemplary embodiment of the disclosure, a protrusion may be continuously formed at (along) the mating position of either of the inner case main body or the inner case cover. Furthermore, a groove designed to receive/engage the protrusion may be continuously formed at (along) the mating position of the other of the inner case main body and the inner case cover. Further, the inner case main body and the inner case cover may be aligned with each other and mated together by engaging the protrusion with (in) the groove. Because of this structure, a packing member such as an O-ring may not be required at the mating position (junction) of the inner case cover 41 and the inner case main body 45. Thus, the number of components (part count) may be reduced to save manufacturing costs.

In another exemplary embodiment of the disclosure, an electric circuit board (printed circuit board) for a battery cell protection circuit may be housed in the inner case. In addition or in the alternative to the battery cell protection circuit, a heat sink for dissipating heat from at least one electronic component mounted on the electric circuit board may be housed in the inner case.

In another exemplary embodiment, an opening may be formed in the inner case and the outer case; an electric wire, such as a cord or electric line, can pass from inside the inner case to outside the outer case via the opening. Furthermore, a sealing member may be located or disposed between the opening in the inner case and the electric wire to prevent water from entering into the inner case along the electric wire.

In another exemplary embodiment of the disclosure, a switch opening for a switch may be formed in the inner case and the outer case. Furthermore, a sealing member may be located or disposed between the switch opening in the inner case and the switch to prevent water from easily entering into the inner case through (from) the switch opening.

In another exemplary embodiment of the disclosure, a connector opening for a connector may be formed in the inner case and the outer case. Furthermore, a sealing member may be located or disposed between the connector opening in the inner case and the connector to prevent water from easily entering into the inner case through (from) the connector opening.

In another exemplary embodiment of the disclosure, the inner case cover and the outer case cover may be integrally formed so as to share a common top plate. Furthermore, the inner case may be fixed to the outer case cover of the outer case by aligning (mating) the inner case with the inner case cover and screw fastening the inner case to the inner case cover. In addition, the outer case main body of the outer case may be aligned (mated) with and screw fastened to the outer case cover, and the outer case main body may be screw fastened to the inner case main body of the inner case.

In another exemplary embodiment of the disclosure, the electronic power supply device may also comprise a plurality of cell holders for housing the plurality of cells. Furthermore, the plurality of cell holders may be housed in the inner case such that adjacent cell holders engage with each other and are relatively immovable at least in a longitudinal direction of the cell holders. Because of this design, even if the electronic power supply device is violently moved (e.g., dropped), it is possible to prevent or impede the battery cells from moving relative to the inner case main body due to their own weight (inertia), and damage to the circuit board comprising the battery cell protection circuit, etc. may be prevented or reduced.

In another exemplary embodiment of the disclosure, the plurality of cell holders may be housed in the inner case such that each of the cell holders is relatively immovable relative to an inner wall surface of the inner case at least in the longitudinal direction of the cell holders.

In another exemplary embodiment of the disclosure, the electronic power supply device may comprise an inner case for housing the plurality of battery cells and an outer case for housing the inner case, and a supporting portion of the outer case that supports the inner case may be located at an area in the outer case other than at a corner portion of the outer case.

Because of this arrangement, the support that supports the inner case and ribs etc. need not be arranged or disposed inside the corner of the outer case. Instead, there may be a (hollow) space at this location. Thus, if the electronic power supply device is dropped and one or more of the corner portions of the outer case collide with a hard surface, the corner portions of the outer case may deflect, bend and/or collapse to some extent, thereby absorbing at least a portion of the impact energy (shock). In this event, the impact energy absorbed, dissipated or deflected at the corner portion(s) of the outer case may not be applied directly to the inner case. As a result, the battery cells (and, e.g., electric circuit board) housed in the inner case may be subjected to a reduced or minimal amount of impact energy, thereby reducing the likelihood that impact-sensitive components of the electronic power supply device will experience damage as a result of the impact.

In another exemplary embodiment of the disclosure, the inner case may comprise an inner case main body having an opening and an inner case cover that covers the opening of the inner case main body. Furthermore, the outer case may comprise an outer case main body having an opening and an outer case cover that covers the opening of the outer case main body. The supporting portion of the outer case that supports the inner case may be located at a position other than at a side wall of the outer case where the outer case main body is mated (aligned) with the outer case cover. Because of this configuration, the side wall of the outer case and the side wall of the inner case need not be connected to each other, and a space may be provided or defined between the side wall of the outer case and the side wall of the inner case. According to this design, even if the electronic power supply device is dropped and the side wall of the outer case is deflected, bent, collapsed, etc. by the impact, at least a portion of the impact energy will be absorbed by the space such that a direct impact force may not be applied to the inner case, or at least the impact force will be reduced.

In another exemplary embodiment of the disclosure, the inner case cover and the outer case cover may be integrally formed such that a top plate of the inner case cover is connected to a top plate of the outer case cover. Because of this design, the top plate of the inner case cover can be supported by the top plate of the outer case cover.

In another exemplary embodiment of the disclosure, the side wall of the outer case and a side wall of the inner case may be parallel to each other at one or more locations other than the corner portions of the outer case. Furthermore, the side wall of the outer case at the corner portions of the outer case may be spaced farther apart from the side wall of the inner case that is non-parallel to the side wall of the inner case. Because of this design, the space at the corner portion of the outer case may be wider than the space at other locations, and thus a greater shock absorbing function may be provided at the corner portion of the outer case than that at a position other than the corner portions.

In another exemplary embodiment of the disclosure, a gap between the side wall of the outer case and the side wall of the inner case at the corner portions of the outer case may be sized greater than that at a position other than the corner portions of the outer case. Because of this design, the shock (impact energy) absorption capability at the corner portion of the outer case may be improved.

In another exemplary embodiment of the disclosure, the side wall of the inner case at the corner portions may be formed into an arc shape. Furthermore, a gap between the arc-shaped side wall of the inner case and the side wall of the outer case may be sized greater than that between the side wall of the inner case other than the corner portions and the side wall of the outer case.

In another exemplary embodiment of the disclosure, the battery cells may be housed in the inner case such that a wide space is obtained on the side of the inner case cover. Because of this design, if the inner case cover of the inner case is deflected, bent or collapsed by an impact, the battery cells located in the inner case may not be affected by the damage to the inner case cover.

In another exemplary embodiment of the disclosure, the inner case may house a circuit board, on which a battery cell protection circuit for monitoring the voltage(s) of the battery cells, a heat sink for dissipating heat from at least one electronic component mounted on the circuit board, and the battery cells. Furthermore, the heat sink may be located on the side of the inner case cover. Because of this design, if the inner case cover of the inner case is deflected, bent or collapsed by an impact, at least a portion of the impact energy may be absorbed by the heat sink since the inner case cover may be caused to abut against, and impact, the heat sink.

According to the present disclosure, the battery cells of the electronic power supply device can be better protected from the ingress of water. In addition or in the alternative, the battery cells may be better protected from impact forces and thus damage if the electronic power supply device is dropped.

Additional objects, features, embodiments, effects and advantages of the present disclosure will become apparent after reading the following detailed description and claims in view of the appended drawings.

DETAILED DESCRIPTION

Figure 1:
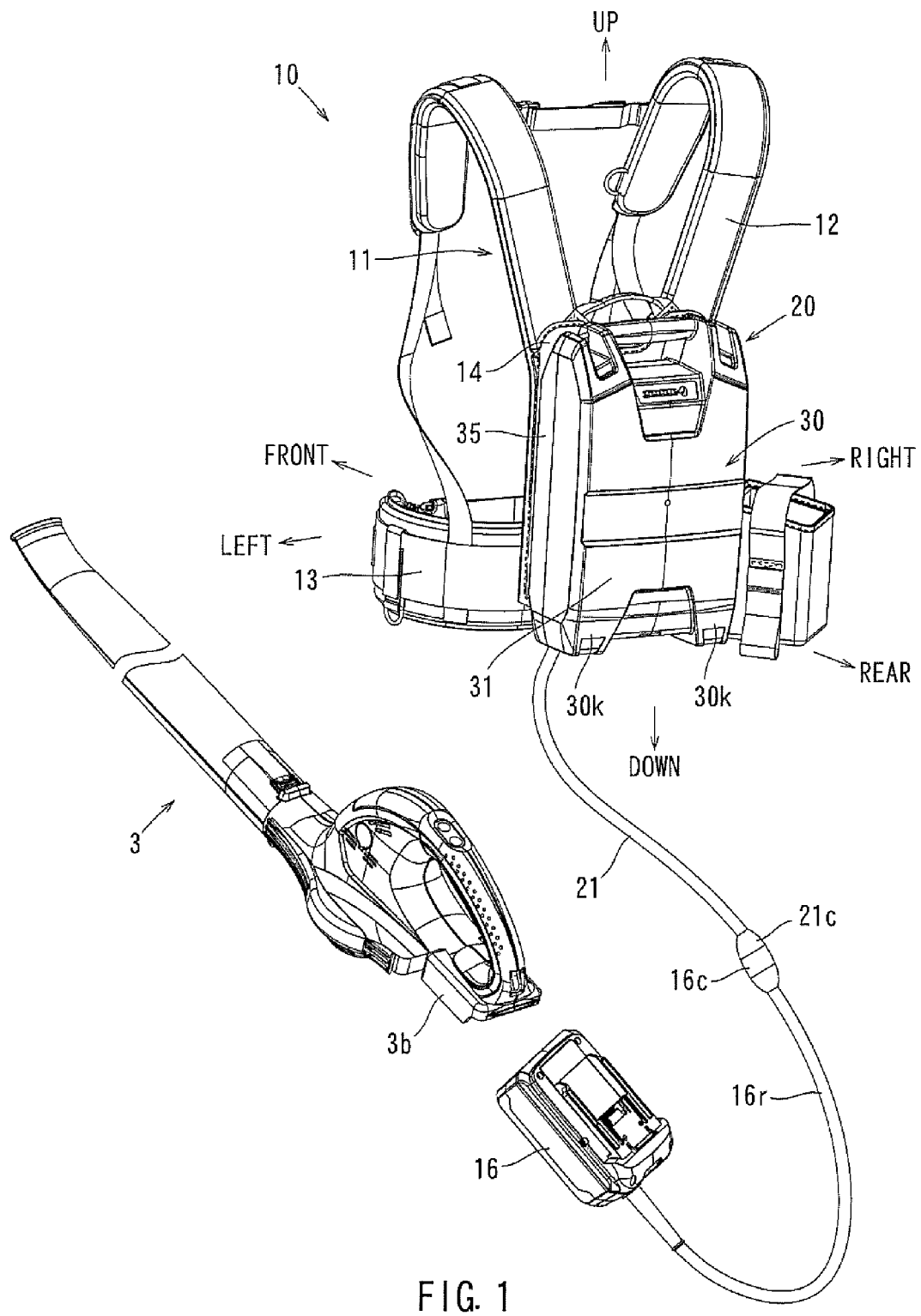
FIG. 1 show an overall perspective view of an electronic power supply device according to one exemplary embodiment of the present disclosure, while being used with an electric blower and connected to a shoulder harness.

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring significant aspects of the exemplary embodiments presented herein.

Hereinafter, an electronic power supply device 10 according to one exemplary embodiment of the present teachings will be described with reference to FIGS. 1 to 30. This electronic power supply device 10 supplies electric power (current) from a plurality of battery cells, e.g., to an electric blower 3 (a representative, non-limiting example of an electronic power equipment according to the present teachings), and optionally may be configured to be carried on an operator's back. The front, rear, left, right, upper, and lower sides in the drawings correspond to the front, rear, left, right, upper, and lower sides of the electronic power supply device 10 when a main body 20 of the electronic power supply device 10 stands upright (or is in a state of being carried and/or worn on the operator's back).

Overview of Electronic Power Supply Device 10

As illustrated in FIG. 1, the electronic power supply device 10 may include the main body 20, a harness 11, which may include a shoulder belt 12, a waist belt 13, and a back surface plate 14 for supporting the main body 20 on the operator's back, and an adapter 16 for physically and electrically connecting an output cable (power cable) 21 of the main body 20 to the electric blower 3. The main body 20 may be configured such that a front surface side of the main body 20 can be screwed onto the back surface plate 14 of the harness 11. The adapter 16 may be designed/manufactured to have the same shape and the same contact terminal structures as a battery pack (not illustrated) for the electric blower 3 such that the adapter 16 is slidably connectable to a battery connecting portion 3b of the electric blower 3 in place of the not-illustrated battery pack of the electric blower 3. In addition, the adapter 16 may include a lead cable 16r having a connector 16c that can be connected to a connector 21c of the output cable 21 of the main body 20.

Overview of the Electric Circuit of Main Body 20

Figure 2:
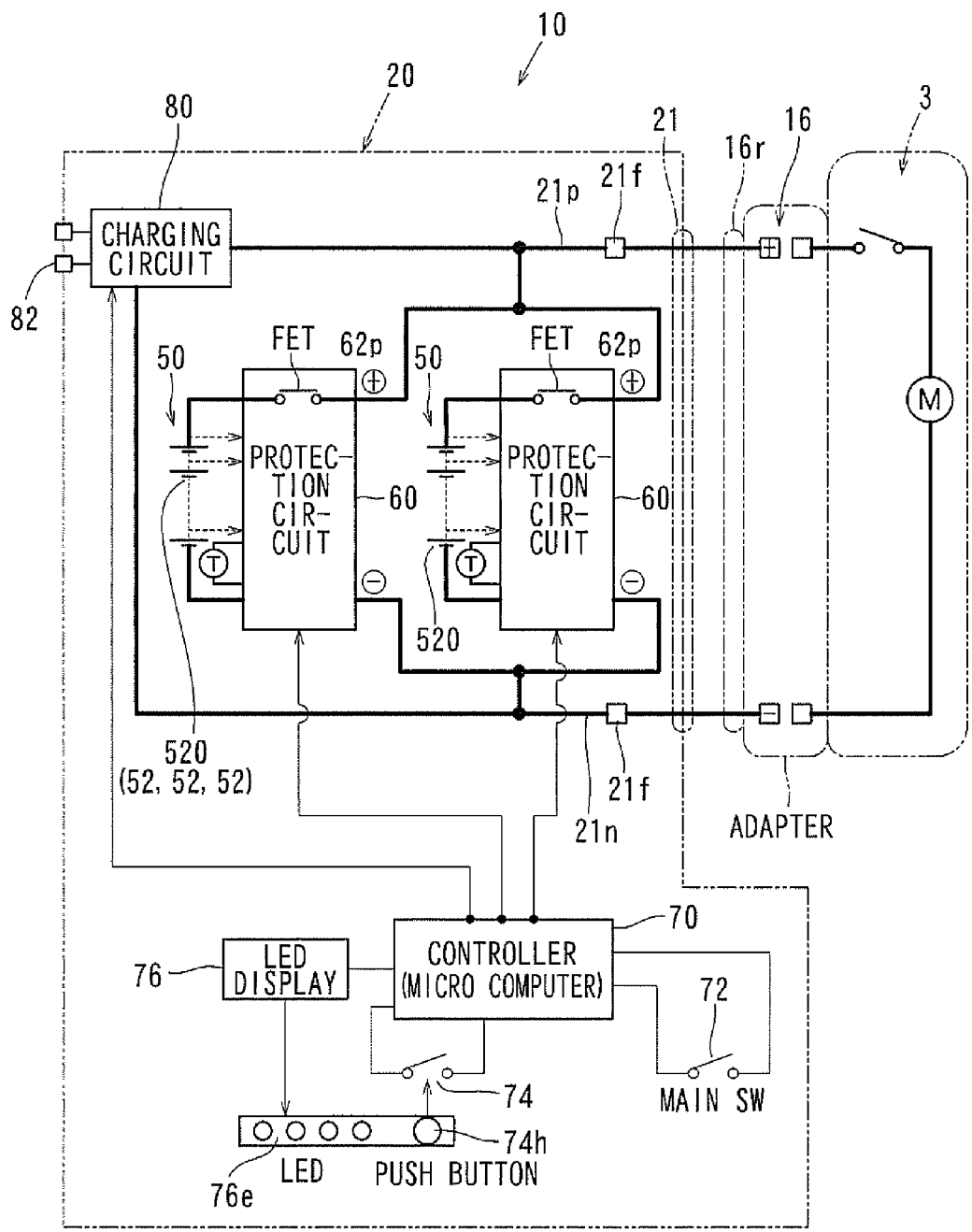
FIG. 2 is a schematic diagram showing an exemplary electric circuit of the electronic power supply device.
Figure 5:
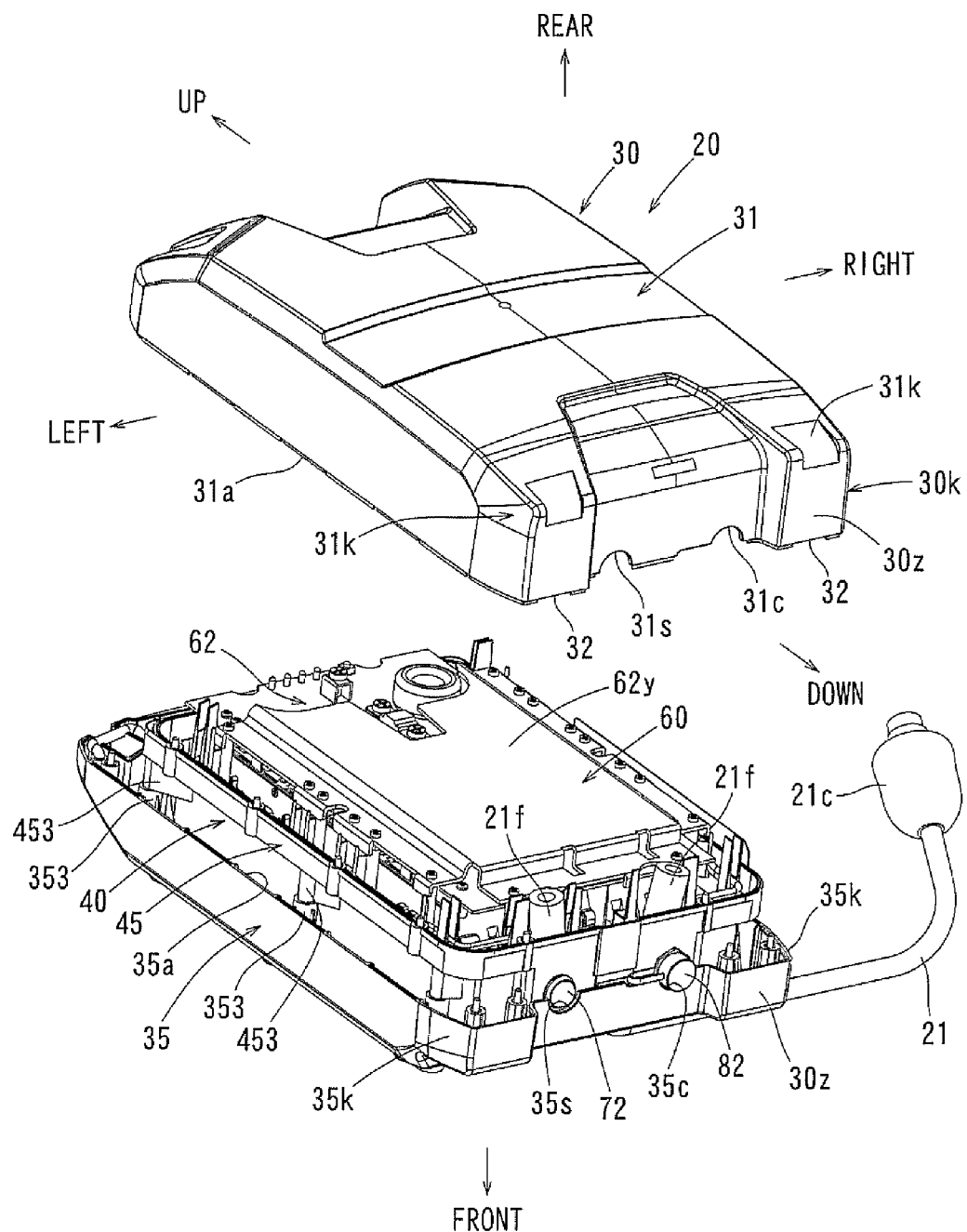
FIG. 5 is a perspective view showing the electronic power supply device of FIG. 1 with the outer case cover of the main body is separated from the main body.

As shown in FIG. 2, a representative, non-limiting electric circuit located within the main body 20 may include two sets of battery cell connection circuits 50 and battery cell protection circuits 60 connected in parallel to each other. Each of the cell connection circuits 50 may include ten (10) sets of cell assemblies 520. Each of the cell assemblies 520 may comprise three battery cells 52, e.g., lithium ion battery cells, connected in parallel to each other, and the cell assemblies 520 may be connected to each other in series. In other words, the number of the battery cells 52 that may be included in the cell connection circuit 50 of each of the two sets may be 30 (i.e. three battery cells in each of the 10 sets). The protection circuits 60 are configured to transmit voltages (voltage signals) and temperature signals of the respective battery cells 52 of the cell connection circuits 50 to a control microcomputer 70 and to control the discharge of the cells 52 based on an output signal from the control microcomputer 70. As shown in FIG. 2, the two cell connection circuits 50 may be connected to electric power supply wires 21p and 21n, and the electric power supply wires 21p and 21n may be connected to the output cable 21 via ferrite cores 21f, which serve to reduce or prevent electrical noise. As shown in FIG. 5, the ferrite cores 21f may be located in housing spaces at the left and right lower end portions of a case main body 45 of an inner case 40, which will be described below. In addition, the two sets of cell connection circuits 50 may be connected to a charging circuit 80 via the electric power supply wires 21p and 21n. The charging circuit 80 may include a connector 82 configured to be electrically connectable to an external electric power supply (not illustrated), such as a commercial mains power supply, e.g., an AC power supply at 120V and 60 Hz. The charging circuit 80 optionally may also include a processor configured to execute a charging program stored in a memory to control the amount of charging current supplied to the battery cells 52 via a power FET (not shown), if such charging function is not executed by the control microcomputer 70.

The control microcomputer 70 may be configured to output a signal for controlling the discharging or charging of the battery cells 52 based on the voltage signals and the temperature signals of the respective battery cells 52. This signal is output to the protection circuits 60 and the charging circuit 80. As shown in FIG. 2, a main switch 72 and a switch 74 for initiating the display of the remaining battery capacity may be connected to the control microcomputer 70. When the main switch 72 is turned ON, the control microcomputer 70 is configured to output a signal to the protection circuits 60 to cause the protection circuits 60 to allow the battery cells 52 to discharge. When the protection circuits 60 receive this signal, FETs 62p are turned ON. As a result, the battery cells 52 are permitted to discharge, i.e. they supply current to an electric load. When the main switch 72 is turned OFF, the control microcomputer 70 is configured to output a signal to the protection circuits 60 to prevent the battery cells 52 from discharging, i.e. to cut-off the supply of current to the electric load. To shut-off the current, the protection circuits 60 are configured to turn OFF FETs 62p which stops the discharging of the battery cells 52. When the switch 74 for displaying the remaining battery capacity is turned ON by operating (pushing) a push button 74h, the control microcomputer 70 outputs a signal to an LED display unit 76. Then, the LED display unit 76 displays the remaining battery capacity of the cells 52 by illuminating one or more LEDs, e.g., by illuminating a number of LEDs in proportion to the remaining battery capacity.

Outer Case 30 of Main Body 20

The main body 20 may include a resinous (plastic) inner case 40 that may house the two sets of the cell connection circuits 50 and the protection circuits 60, the charging circuit 80, the control microcomputer 70 etc., and a resinous (plastic) outer case 30 that may house the inner case 40. As shown, e.g., in FIGS. 3 and 4, the outer case 30 may be formed to have a substantially rectangular parallelepiped box shape in which the front-rear direction may be defined as the thickness direction, the left-right direction may be defined as the width direction, the up-down direction may be defined as the vertical direction. Preferably, the width of the outer case 30 is longer than its thickness, and the vertical length of the outer case 30 is longer than its width. Projecting portions 30s project upward and may be formed on both the left and right sides of an upper portion of the outer case 30; a shaft-shaped grip portion 30t may extend between the left and right projecting portions 30s. Therefore, the outer case 30 may be held and carried by grasping the grip portion 30t. In addition, leg portions 30k, which may be configured to project downward and allow the outer case 30 to be held (stand) upright, may be located on both the left and right sides of a lower portion of the outer case 30.

Figure 6:
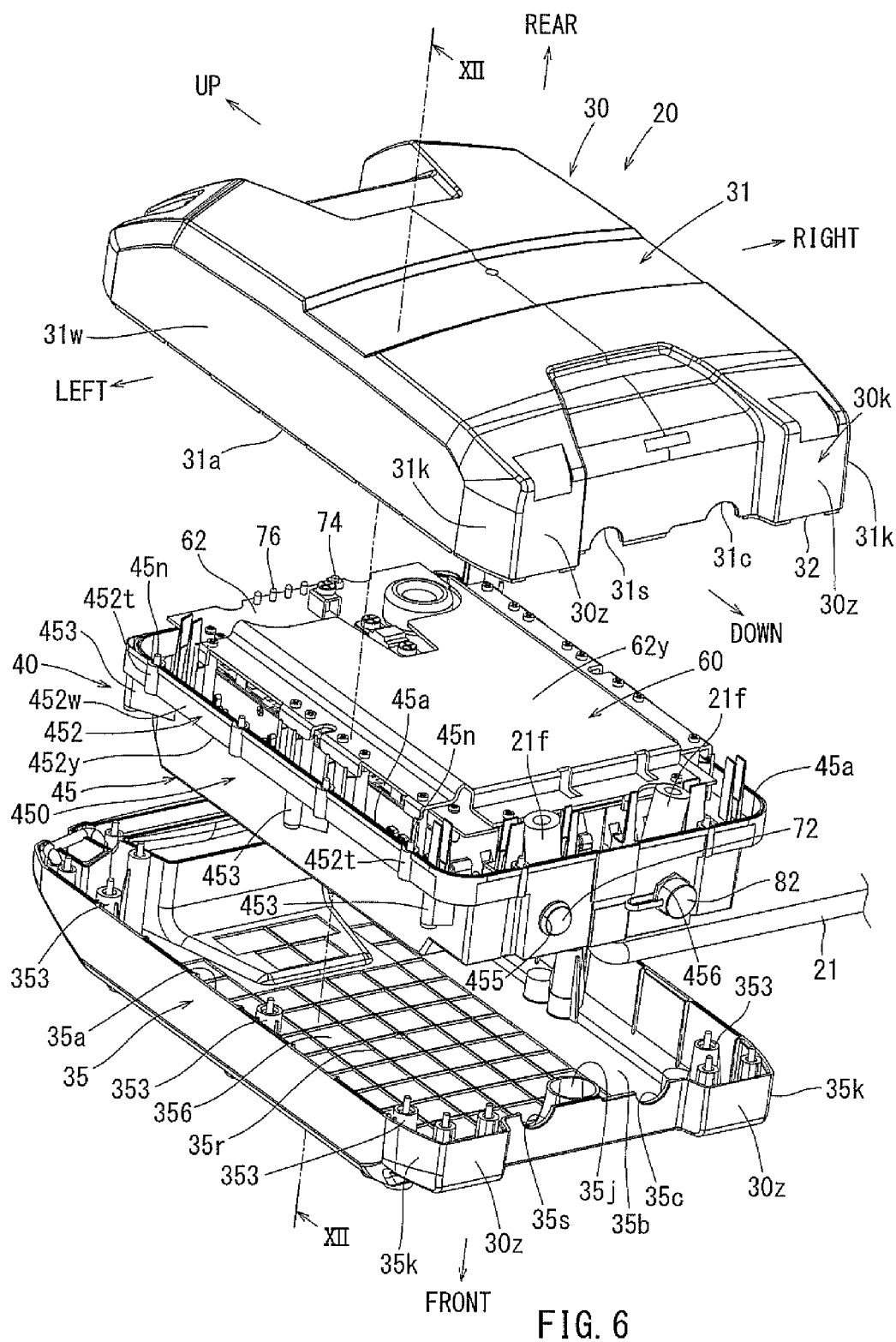
FIG. 6 is an exploded perspective view of the main body.
Figure 7:
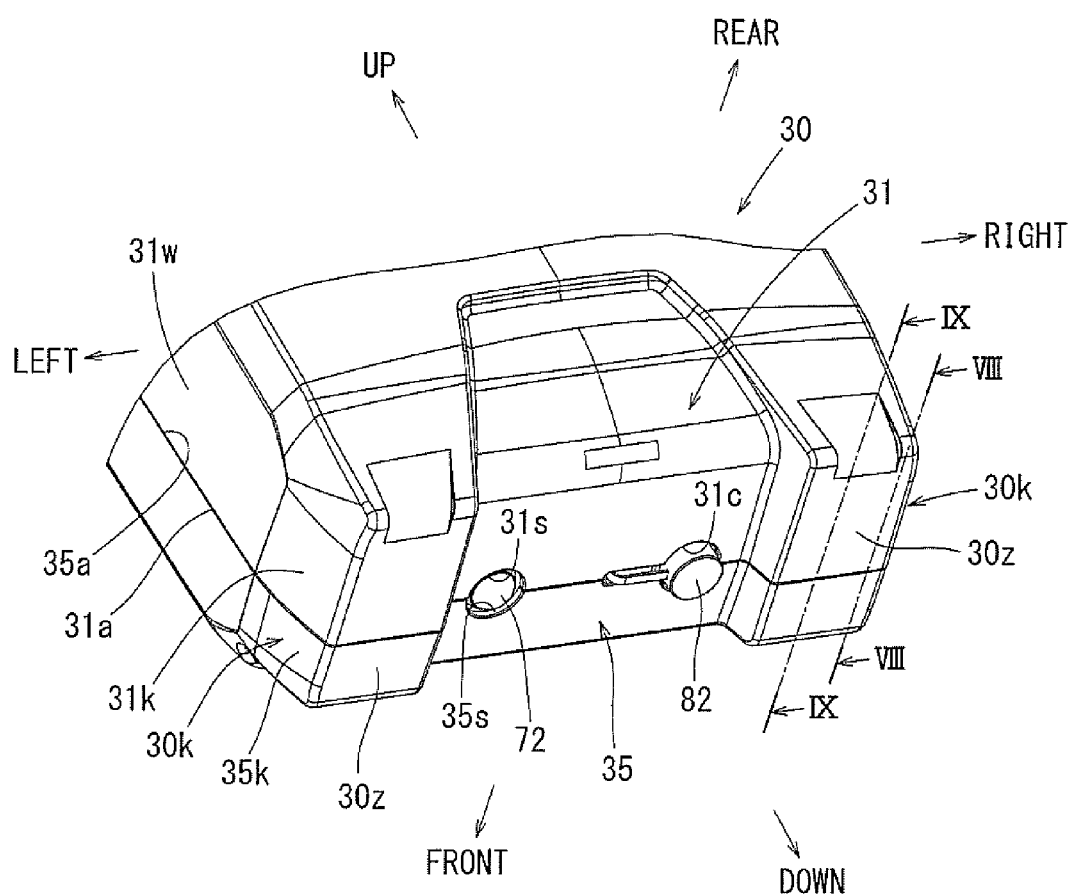
FIG. 7 is a perspective view showing a leg portion of the main body.

As shown in FIGS. 5 and 6, the outer case 30 may include an outer case main body 35 and an outer case cover 31. The outer case main body 35 may be formed to have the shape of a polygonal open container that opens rearward (in the upward direction in FIG. 5). The outer case cover 31 may be formed to have the shape of a polygonal open container that opens forward (in the downward direction in FIG. 5). The outer case main body 35 and the outer case cover 31 may be configured to be aligned and mated (joined) with each other by moving them together in the front-rear direction. As shown in FIGS. 5 to 7, switch openings 35s and 31s and connector openings 35c and 31c may be formed, separate from each other and between the left and right leg portions 30k, at (along) mating (alignment) positions (portions) 35a and 31a of the outer case main body 35 and the outer case cover 31. In other words, the switch openings 35s and 31s and the connector openings 35c and 31c may be formed at positions in the vertical direction that are higher than the ground contact surfaces 30z of the leg portions 30k. The switch openings 35s and 31s may be shaped to define, when proximal to each other, an opening for the passage of an operation portion (e.g., button, knob, toggle, etc.) of the main switch 72 (refer to FIG. 2). Further, the switch openings 35s and 31s may include the semicircular opening portion 35s on the outer case main body 35 and the semicircular opening portion 31s on the outer case cover 31, which may be aligned and mated (joined) with each other. The connector openings 35c and 31c may be shaped to define, when proximal to each other, an opening for the passage of the connector (i.e. the power input plug or terminal) 82 of the charging circuit 80. Further, the connector openings 35c and 31c may include the semicircular opening portion 35c on the outer case main body 35 and the semicircular opening portion 31c on the outer case cover 31, which may be aligned and mated (joined) with each other.

Figure 8:
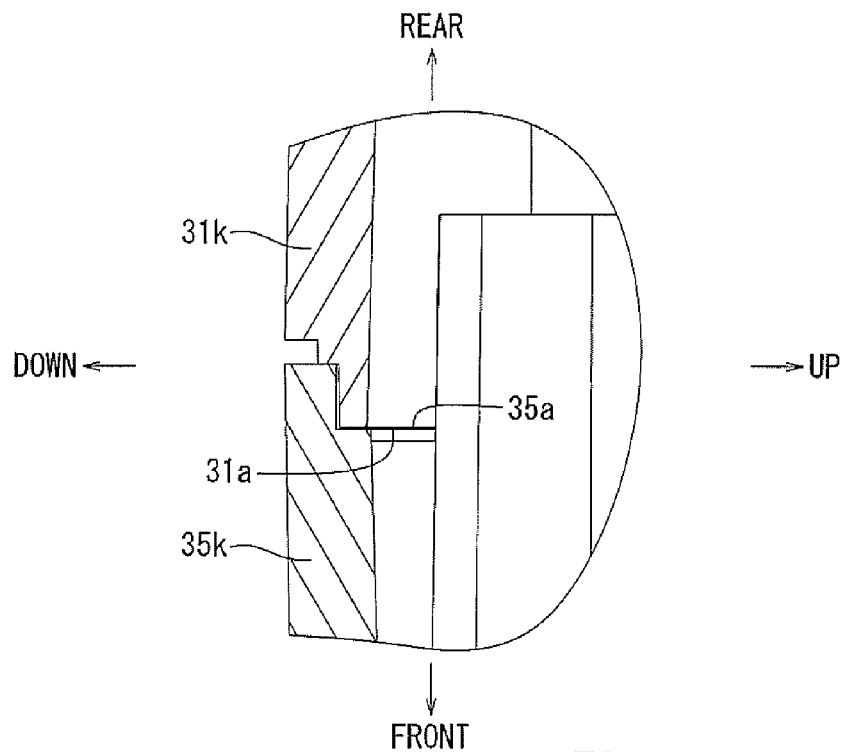
FIG. 8 is a sectional view taken along arrow VIII-VIII in FIG. 7.
Figure 9:
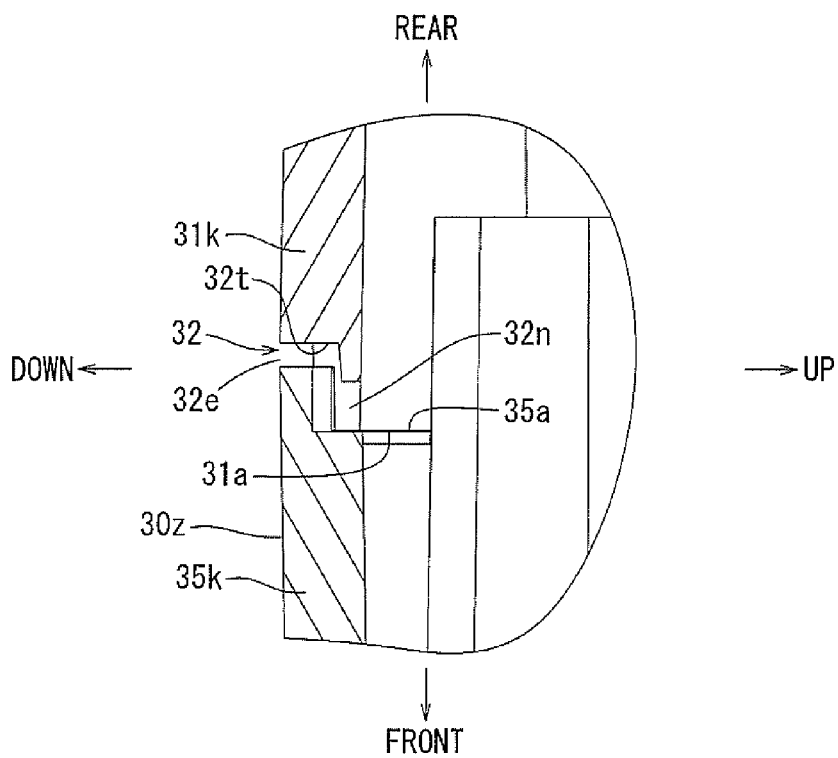
FIG. 9 is a sectional view taken along arrow IX-IX in FIG. 7.

As shown in FIG. 7, the leg portions 30k of the outer case 30 may include case-side leg portions 35k of the outer case main body 35 and cover-side leg portions 31k of the outer case cover 31, which may be aligned and mated (joined) with each other at (along) the mating positions 35a and 31a. Further, as shown in FIG. 9, drainage holes 32 are designed to allow the inside of the outer case 30 to communicate with the outside (exterior) of the outer case 30, and may be formed in the ground contact surfaces 30z of the leg portions 30k at the mating positions 35a and 31a of the case-side leg portions 35k and the cover-side leg portions 31k. As shown in FIG. 8, the mating positions 35a and 31a of the outer case main body 35 and the outer case cover 31, other than the ground contact surfaces 30z of the leg portions 30k, may be fitted into each other such that water is prevented or impeded from entering into the outer case 30. As shown in FIG. 9, the drainage holes 32 may include case inside openings 32n, case outside openings 32e, and drainage passages 32t that fluidly connect the case inside openings 32n to the case outside openings 32e. The case inside openings 32n are offset from the case outside openings 32e so that these openings and the drainage passages 32t have a substantially Z-shaped cross-section. Since the drainage holes 32 may be formed in the ground contact surfaces 30z of the leg portions 30k as described above, any water that enters into the outer case 30 and accumulates in the leg portions 30k can be effectively drained to the outside. Further, since the case inside openings 32n are offset from the case outside openings 32e, dust, debris, etc. is impeded from entering into the outer case 30 from the outside through the drainage holes 32. That is, the cross-section of the drainage holes 32 is preferably designed to form a "tortuous path" that effectively prevents the ingress of solid particles, etc. in the manner of a labyrinth seal.

Figure 10:
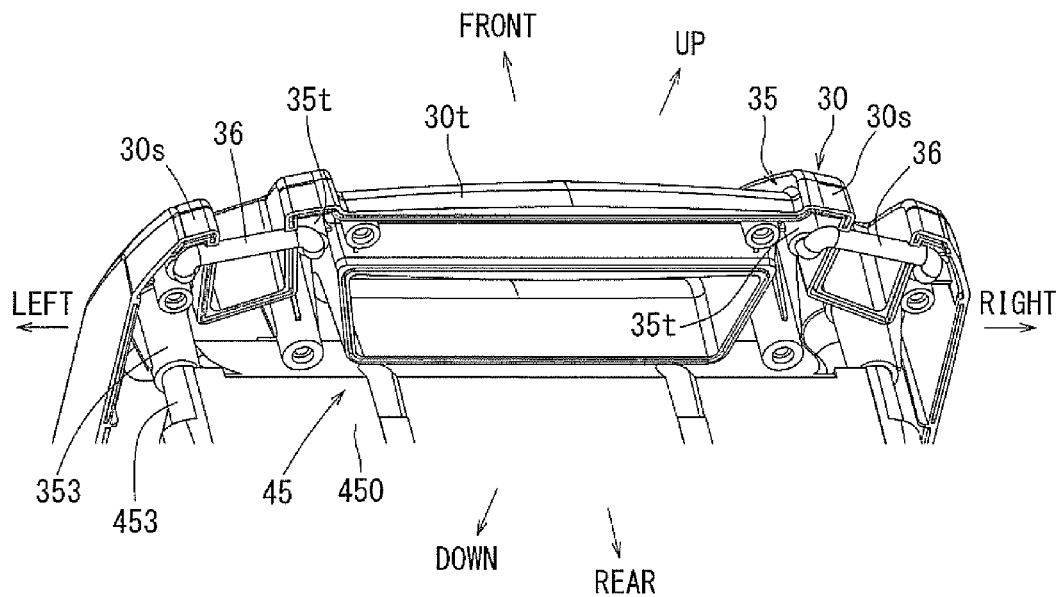
FIG. 10 is a perspective view of a part of the main body where a stabilizer hook may be hung or connected.
Figure 11:
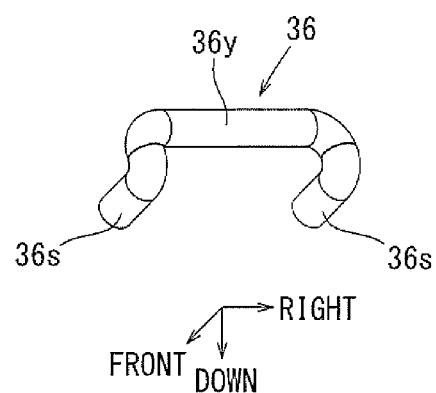
FIG. 11 is a perspective view of a receiving bar of the main body where the stabilizer hook may be hung or connected.

As shown in FIG. 10, receiving bars 36, at or along which a stabilizer hook or connecting clip (not illustrated) of the harness 11 may be hung or connected, may be located in the left and right projecting portions 30s at the upper portion of the outer case 30. As shown in FIG. 11, each receiving bar 36 may include a linear portion 36y extending in the left-right direction and bent portions 36s bent by approximately 90° in the downward direction from both end portions of the linear portion 36y. Further, end tips of the bent portions 36s may be bent by approximately 90° forward. As shown in FIG. 10, the respective tips of the left and right bent portions 36s of the receiving bars 36 may be fitted into cylindrical supports 35t that may be located inside the outer case main body 35 of the outer case 30. Accordingly, the receiving bars 36 are designed to resist movement to the front, rear, left, right, upper, and lower sides even if the projecting portions 30s of the outer case 30 are subjected to an impact or other kind of shock or impulse.

Figure 12:
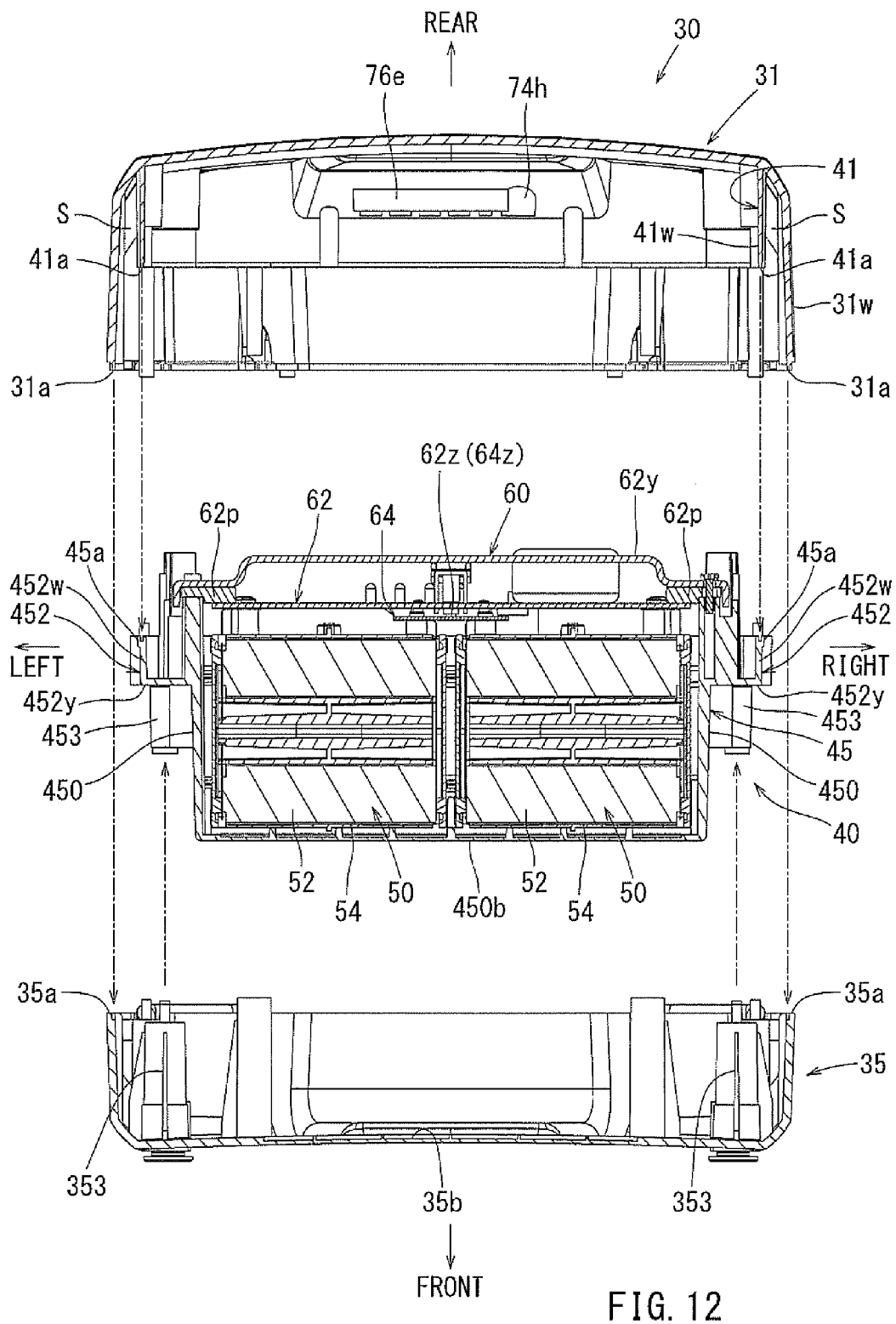
FIG. 12 is an exploded vertical sectional view of the main body, taken along arrow XII-XII in FIG. 6.

Referring now to FIG. 12, a bottom plate 35b of the outer case main body 35 of the outer case 30 (front surface side of the main body 20) may be screw-fastened to the back surface plate 14 of the harness 11. As shown in FIG. 6, the bottom plate 35b of the outer case main body 35 may be configured such that a peripheral portion (circumferential edge part) thereof can be screw-fastened to the back surface plate portion 14 of the harness 11 and may also be configured such that a part (portion or region) located on an inward side of the circumferential edge part may have a slightly concave surface with respect to the back surface plate portion 14. The concave part of the bottom plate 35b of the outer case main body 35 may be thin. Lattice-shaped reinforcing ribs 35r optionally may be formed at (on) the thin part 35b of the bottom plate 35b in the outer case main body 35 in order to increase the stiffness of the bottom plate 35b.

Figure 3:
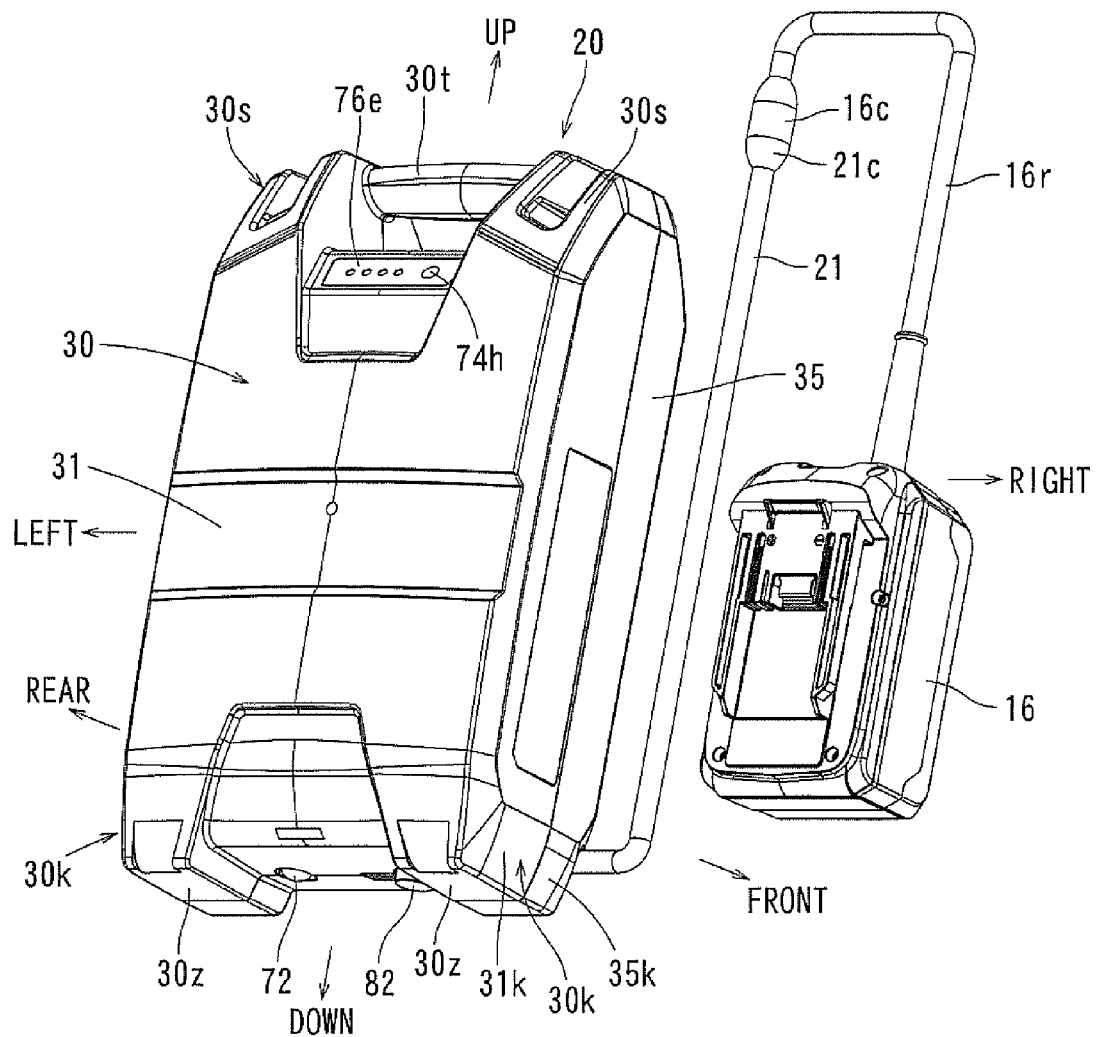
FIG. 3 is a perspective view showing, e.g., a main body of the electronic power supply device, and an adapter for connecting to the electric blower.
Figure 4:
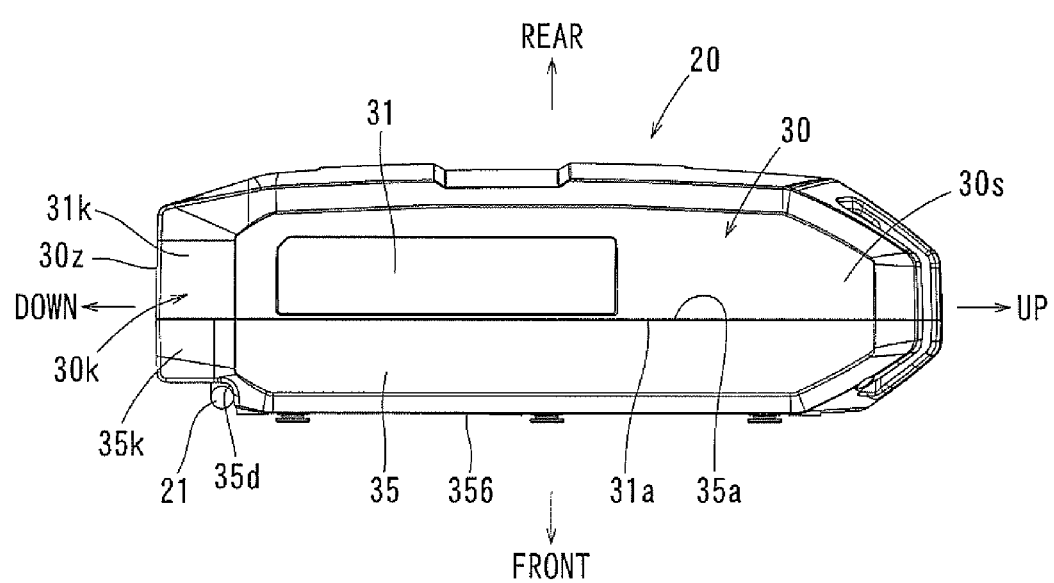
FIG. 4 is a side view of the main body.
Figure 22:
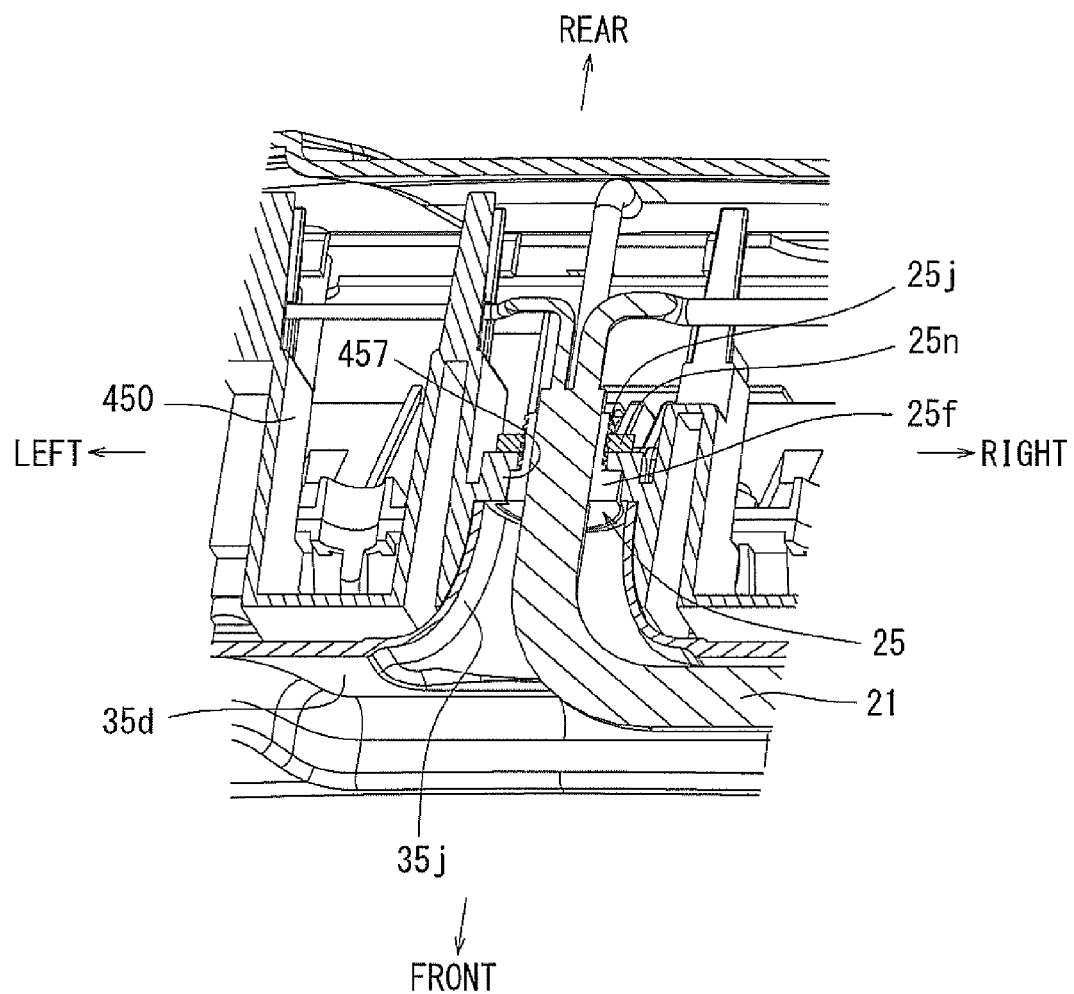
FIG. 22 is a vertical sectional view showing a waterproof clamp.

As shown in FIG. 6, a funnel-shaped electric wire opening 35j may be formed at (in) a central position at a lower end of the outer case main body 35. The electric wire opening 35j is designed as a passage for the output cable 21 that extends out from the inner case main body 45 of the inner case 40, which is described below. The electric wire opening 35j may be configured such that the opening inside the outer case main body 35 has a relatively small diameter and the opening outside the outer case main body 35 widens as shown in FIG. 22. As shown in FIGS. 4 and 22, the opening outside the electric wire opening 35j may be located at the position of a stepped concave portion 35d that may be formed outside a lower portion of the outer case main body 35. Accordingly, as shown in FIG. 4, the output cable 21 extends out from the outer case main body 35 through the electric wire opening 35j and may be housed in an unobstructive and space-efficient manner in the stepped concave portion 35d of the outer case main body 35. As shown in FIG. 3, the output cable 21 may be configured to extend from the electric wire opening 35j of the outer case main body 35 to the projection portions 30a along the perimeter (periphery) of the outer case main body 35.

Inner Case 40 of Main Body 20

Figure 13:
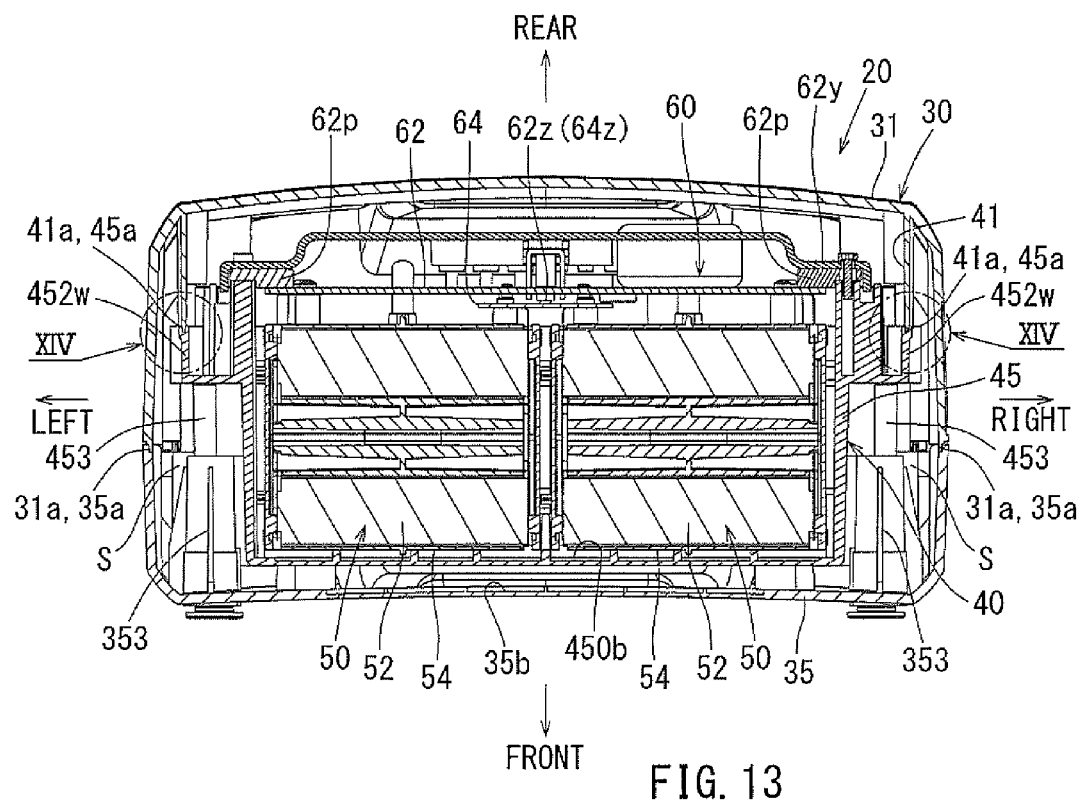
FIG. 13 is a vertical sectional view of the main body.
Figure 14:
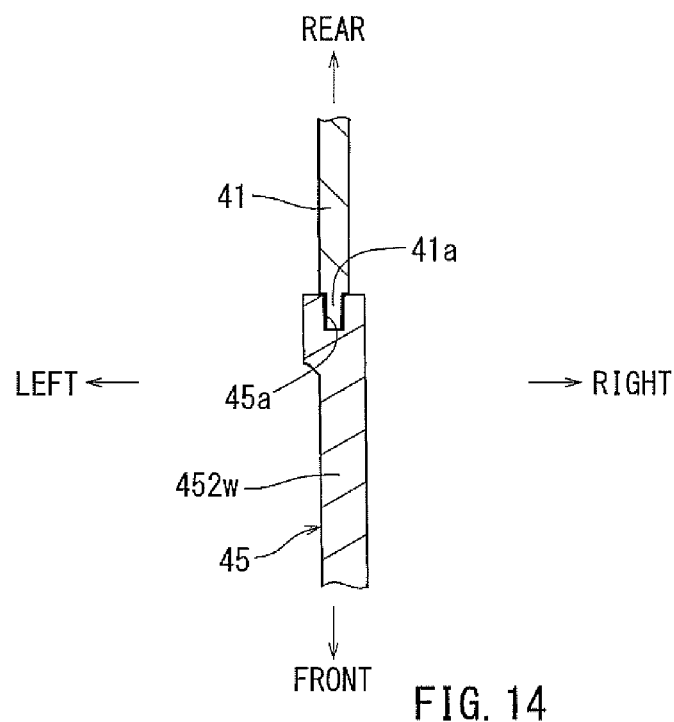
FIG. 14 is an enlarged view of region XIV in FIG. 13.

The inner case 40 may be a waterproof case and may house the two sets of the battery cell connection circuits 50 (cell holders 54) and the protection circuits 60, the charging circuit 80, and the control microcomputer 70 etc. while being disposed inside the outer case 30 as shown in FIGS. 12 and 13. The inner case 40 may be configured to be housed or supported in the outer case 30 such that a hollow or open space S is defined (provided), at least in part, around or along the lateral sides and/or along the bottom of the inner case 40. Further, the inner case 40 may include the inner case main body 45 and an inner case cover 41. The inner case main body 45 may be formed in the shape of a polygonal open container that is open in the rearward direction (in the upward direction in FIG. 12). The inner case cover 41 may be formed in the shape of a polygonal open container and may be aligned and mated with the rearward side of the inner case main body 45 (above in FIG. 12). As shown in FIG. 12, the inner case cover 41 may be integrally molded with the outer case cover 31 and thus may share a common top plate with the outer case cover 31 of the outer case 30. In other words, the top plate of the outer case cover 31 serves as an exemplary example of a support for the outer case according to the present disclosure. As shown in FIG. 14, protrusions 41$a$ that extend continuously (or discontinuously) in a circumferential (peripheral) direction may be formed at or along the mating positions of the inner case cover 41 (along the periphery of the opening of the inner case cover 41) with the inner case main body 45. In addition, grooves 45$a$, into which the protrusions 41$a$ of the inner case cover 41 may be fitted, may continuously (or discontinuously) extend in the circumferential (peripheral) direction at or along the mating positions of the inner case main body 45 (along the periphery of the opening of the inner case main body 45) with the inner case cover 41. Naturally, in an alternative embodiment, the protrusion(s) could be instead formed on the inner case main body 45 and the groove(s) could be formed on the inner case cover 41. When the inner case cover 41 is mated or joined with the inner case main body 45 as shown in FIG. 13 and the protrusions 41$a$ of the inner case cover 41 fit or engage in the grooves 45$a$ of the inner case main body 45 as shown in FIG. 14, a watertight inner case 40 is formed.

Figure 15:
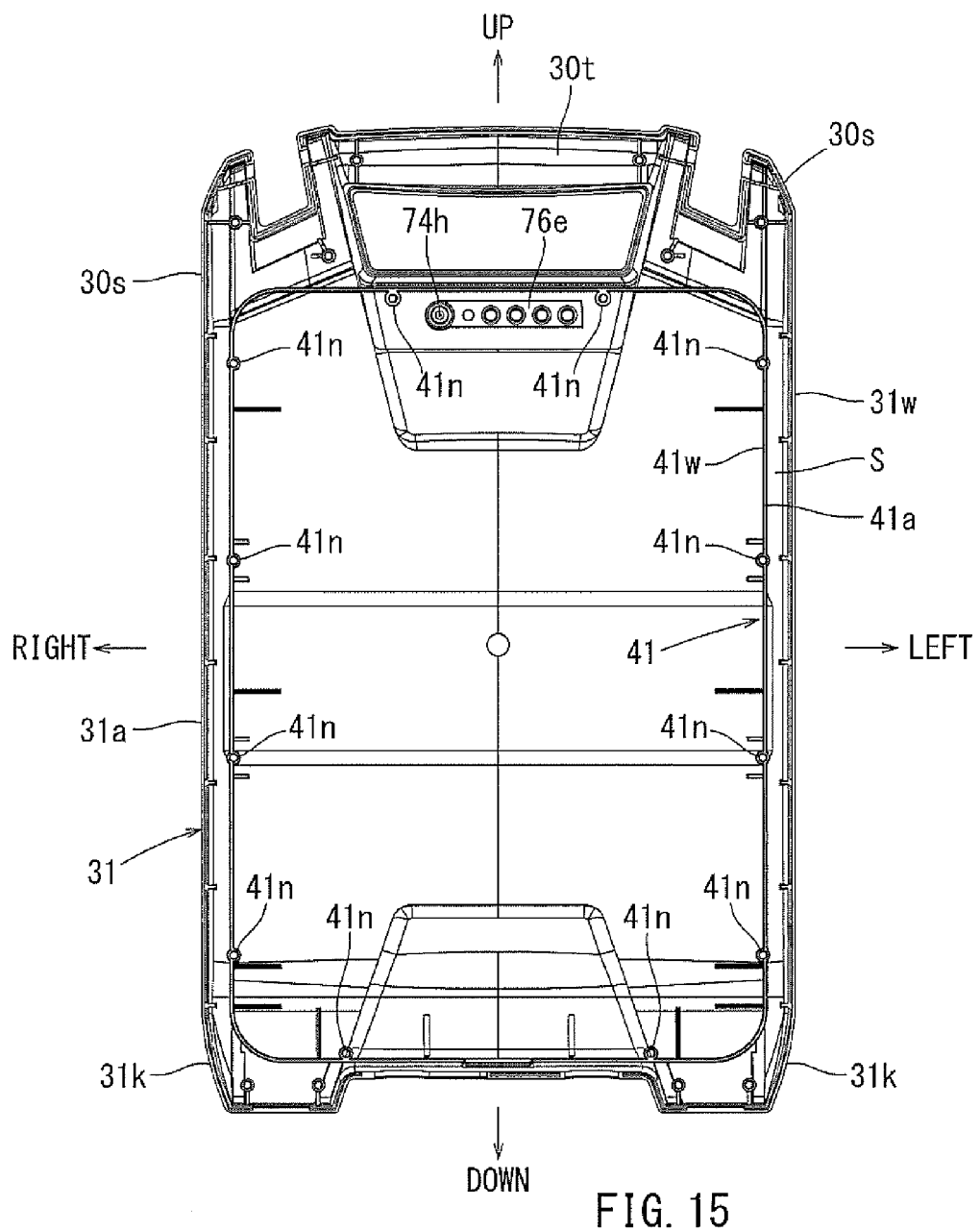
FIG. 15 is a plan view of the outer case cover and an inner case cover of the main body from the inside.

As shown in FIG. 15, the inner case cover 41 may be centrally disposed with respect to the projecting portions 30$s$ and the cover side leg portions 31$k$ of the outer case cover 31 of the outer case 30. The space S (or a portion thereof) may be formed or defined between each side wall 41$w$ of the inner case cover 41 and its adjacent side wall 31$w$ of the outer case cover 31. Since it is possible to arrange the inner case cover 41 at a position close to the center of the outer case cover 31 as described above, the space S between the respective side walls 41$w$ of the inner case cover 41 and the respective side walls 31$w$ of the outer case cover 31 may be relatively large at the corner portions of the outer case cover 31, i.e. inside the left and right projecting portions 30$s$ and the leg portions 30$k$. As shown, e.g., in FIG. 12, the height of the side walls 41$w$ of the inner case cover 41 may be designed to be sufficiently smaller than the height of the side walls 31$w$ of the outer case cover 31. In this case, the protrusions 41$a$ formed at the mating positions of the inner case cover 41 may be located inside the outer case cover 31 in the depth direction with respect to the mating positions 31$a$ of the outer case cover 31. As a result, the mating positions (portions) 41$a$ and 45$a$ of the inner case 40 (i.e. the junction of the inner case cover 41 and the inner case main body 45) may be located inside the outer case cover 31 of the outer case 30 in the depth direction, as shown in FIG. 13, when the inner case cover 41 and the inner case main body 45 are aligned and mated with each other. Consequently, even if water enters through/via (from) the mating positions 31$a$ and 35$a$ of the outer case 30 (i.e. water enters at or through the junction of the outer case cover 31 and the outer case main body 35), such water can not easily reach the mating positions 41$a$ and 45$a$ (junctions) of the inner case 40, thereby better protecting the sensitive electronic components within the inner case 40 from damage caused by water/moisture.

Figure 17:
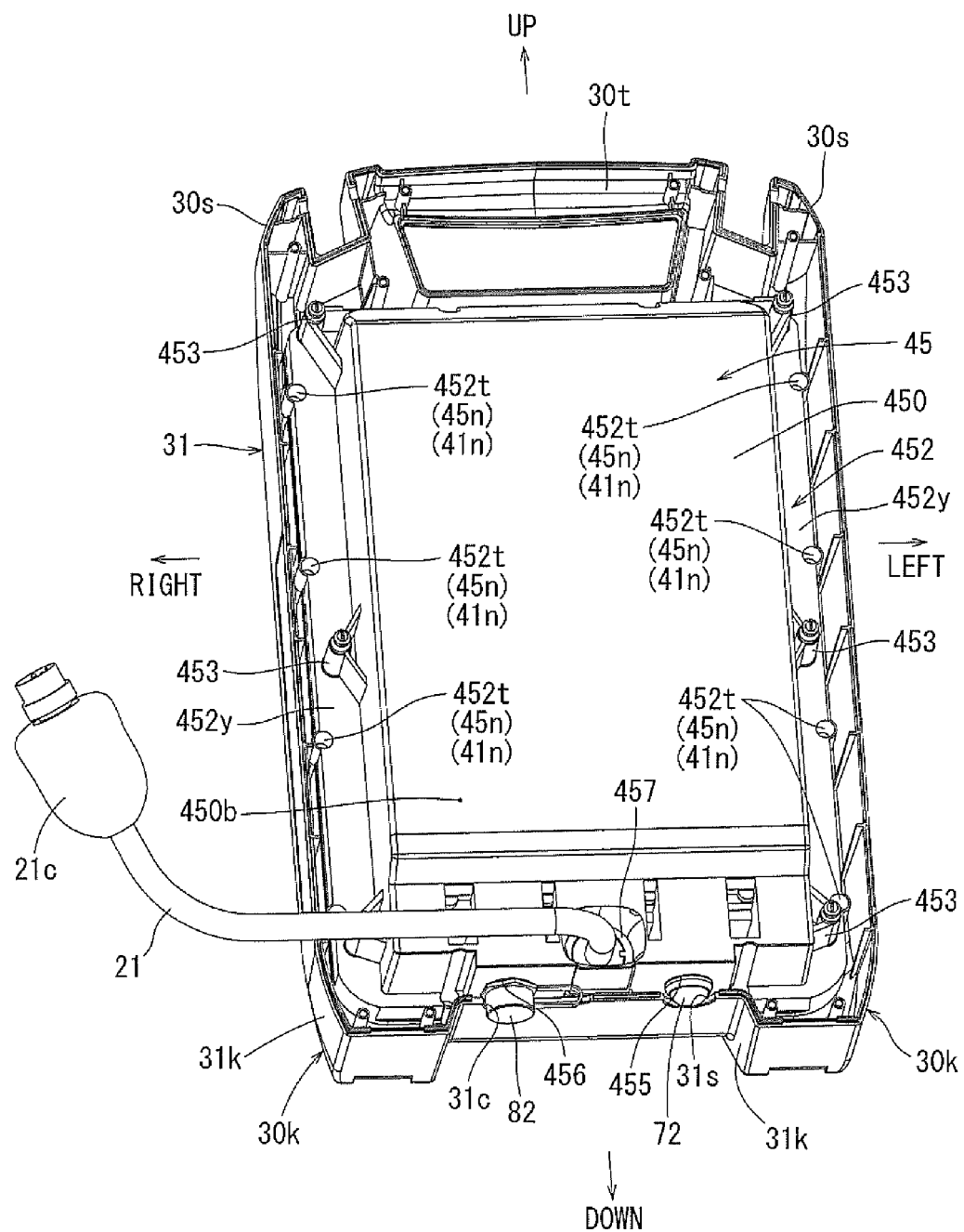
FIG. 17 is a perspective view of the inside of the outer case cover showing an inner case main body screw fastened to the inner case cover.

As shown in FIG. 15, screw holes 41$n$ may be formed or defined at regular intervals in the circumferential (peripheral) direction at (along) the mating positions (portions) of the inner case cover 41, that is, at the positions of the protrusions 41$a$. The number of the screw holes 41$n$ may be, for example, twelve (12). As shown in FIG. 17, screws 45$n$ (refer to FIG. 6) may be located at (along) the mating positions of the inner case main body 45, that is, at the positions of the grooves 45$a$, and may be configured to be respectively screwed into the screw holes 41$n$ of the inner case cover 41. When the protrusions 41$a$ of the inner case cover 41 are fitted into the grooves 45$a$ of the inner case main body 45 and the screws 45$n$ are respectively screwed into the screw holes 41$n$, a waterproof inner case 40 results. In this state, the inner case 40 may be fixed to the outer case cover 31 of the outer case 30 as shown in FIG. 17.

As shown in FIGS. 6 and 12, the inner case main body 45 may include a cell housing section 450 that may be formed in the shape of a polygonal open container, and may also include a frame-shaped portion 452 that may be formed at or along an open circumferential (peripheral) edge of the cell housing section 450. As shown in FIG. 12, the frame-shaped portion 452 of the inner case main body 45 may be formed as a substantially L-shaped part having lateral walls 452$y$ and vertical walls 452$w$. The grooves 45$a$, into which the protrusions 41$a$ of the inner case cover 41 may be respectively fitted, may be formed at the upper end positions of the vertical walls 452$w$ of the frame-shaped portion 452 of the inner case main body 45. As shown in FIG. 6, screw-holding tube portions 452$t$, which are designed to respectively hold the screws 45$n$ at predetermined positions of the grooves 45$a$, may be formed on the vertical walls 452$w$ of the frame-shaped portion 452 of the inner case main body 45.

As shown in FIGS. 12 and 17, the lateral walls 452$y$ of the frame-shaped portion 452 of the inner case main body 45 may be supported by a plurality of supporting tube portions 453 that may extend from portions of the lateral walls 452$y$ toward a bottom plate 450$b$ of the cell housing section 450. As shown in FIG. 17, three of the supporting tube portions 453 may be located at regular intervals on the left side of the frame-shaped portion 452 of the inner case main body 45, and three of the supporting tube portions 453 may be located at regular intervals on the right side of the frame-shaped portion 452 of the inner case main body 45. The outer circumferential surfaces of the supporting tube portions 453 may be fixed to an outer wall surface of the cell housing section 450 via ribs or the like. As shown in FIGS. 12 and 13, six pillars (columns or pins) 353 may be located in the outer case main body 35 at positions corresponding to the supporting tube portions 453 of the inner case main body 45. The six pillars 353 may extend perpendicular to the bottom plate 35$b$ of the outer case main body 35. It should be noted that, in the alternative, the six pillars 353 may be located at positions other than the corner portions of the outer case main body 35, e.g., at the positions of the left and right projecting portions 30$s$ and the leg portions 30$k$, as shown in FIG. 6.

Figure 18:
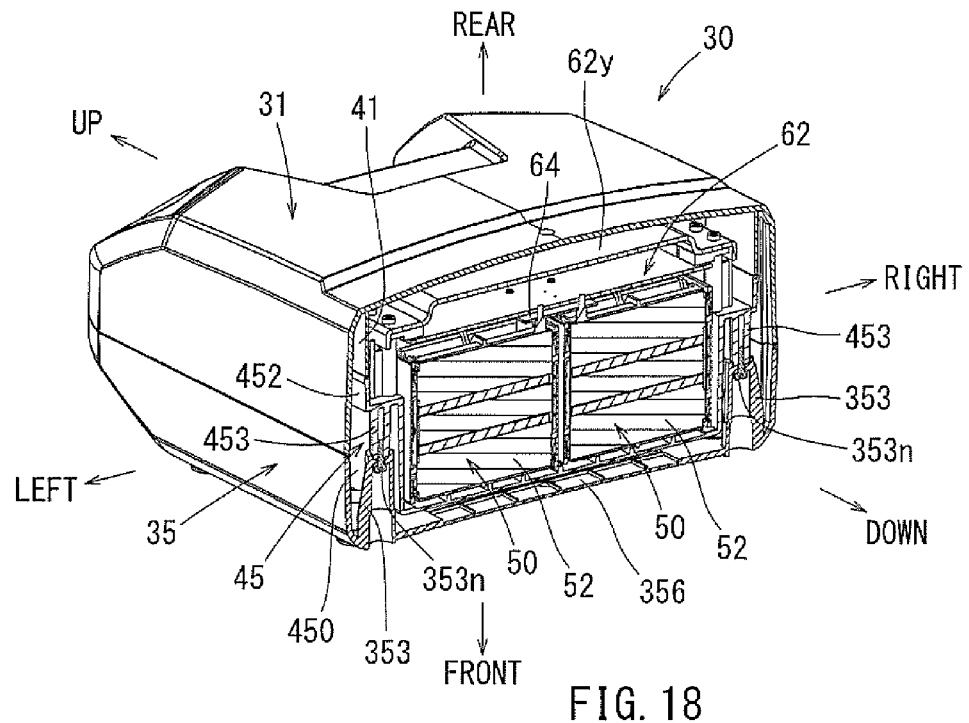
FIG. 18 is a perspective view of a screw fastening structure, using which the outer case main body is screw fastened to the inner case main body.
Figure 19:
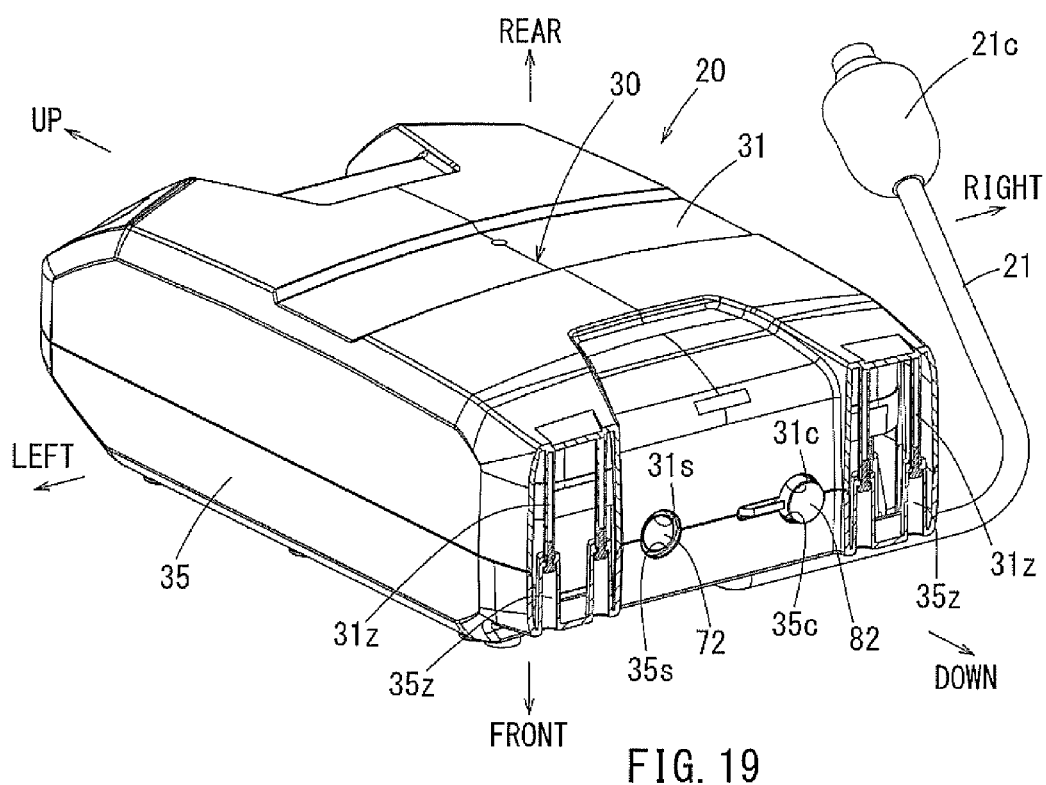
FIG. 19 is another perspective view showing the screw fastening structure, using which the outer case main body is screw fastened to the outer case cover.

As shown in FIG. 13, the space S (or a portion thereof) may be formed or defined between the side walls of the inner case main body 45 and the corresponding side walls of the outer case main body 35 when the supporting tube portions 453 of the inner case main body 45 are supported by the pillars 353 of the outer case main body 35. In addition, a space may be also formed between the bottom plate 450$b$ of the inner case main body 45 and the bottom plate 35$b$ of the outer case main body 35. As shown in FIG. 18, screws 353$n$ may be used to screw fasten the pillars 353 of the outer case main body 35 to the supporting tube portions 453 of the inner case main body 45, and may be housed in the pillars 353 of the outer case main body 35. The pillars 353 of the outer case main body 35 may be screw fastened to the supporting tube portions 453 of the inner case main body 45 in this manner, and thus the outer case main body 35 may be connected (joined) to the inner case main body 45. In other words, the outer case main body 35 may be connected (joined) to the outer case cover 31 (outer case 30) via the inner case main body 45 and the inner case cover 41 (inner case 40). In addition, the outer case cover 31 and the outer case main body 35 of the outer case 30 may be configured to be directly screw fastened together via connecting tube portions 31z and 35z, as shown in FIG. 19, at the corner portions of the outer case 30, that is, at the positions of the left and right projecting portions 30s and the leg portions 30k. In other words, the six pillars 353 of the outer case main body 35 serve as an exemplary embodiment of the supports for the outer case according to the present disclosure.

As shown in FIG. 17, a switch opening 455 and a connector opening 456 may be formed or defined at positions or locations corresponding to the switch openings 35s and 31s and the connector openings 35c and 31c of the outer case 30 in the inner case main body 45 (cell housing section 450) of the inner case 40. An electric wire (line or cord) opening 457 may be formed at a position or location corresponding to the electric wire opening 35j of the outer case main body 35 in the cell housing section 450 of the inner case main body 45.

Figure 20:
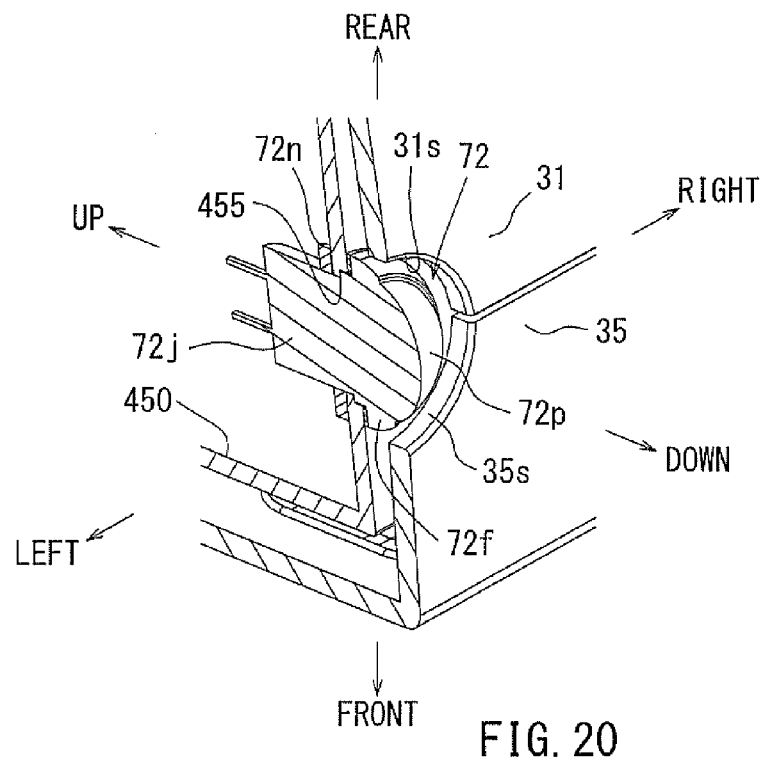
FIG. 20 is a vertical sectional view showing how a main switch is attached.

As shown in FIG. 20, the switch opening 455 of the inner case main body 45 (cell housing section 450) may be located or positioned so that it can receive a main body shaft portion 72j of the main switch 72. As shown in FIG. 2, the main switch 72 may be a waterproof switch designed for selectively opening and closing a circuit containing the battery cells 52, and a tip side of the main body shaft portion 72j may include a large-diameter flange 72f. An operation portion 72p, which may be movable relative to the flange 72f and the main body shaft portion 72j, may be located inside the flange 72f in the radial direction. The main body shaft portion 72j of the main switch 72 may have a male screw thread formed or defined on its outer circumferential surface, and a locknut (pressing nut) 72n may be screwed onto the male thread. A ring-shaped seal material, which may comprise an elastic body, e.g., made of an elastomer (not illustrated), such as, e.g., natural or synthetic rubber or polyurethane, may be located around the main body shaft portion 72j of the main switch 72 and may be tightly pressed against the flange 72f. In such an embodiment, the main switch 72 may be attached to the switch opening 455 in a watertight manner with the main body shaft portion 72j of the main switch 72 passing through the switch opening 455 of the cell housing section 450 and the locknut 72n screwed onto the male thread of the main body shaft portion 72j. The operation portion 72p of the main switch 72 may thus be operated or manipulated at the switch openings 35s and 31s of the outer case 30.

Figure 21:
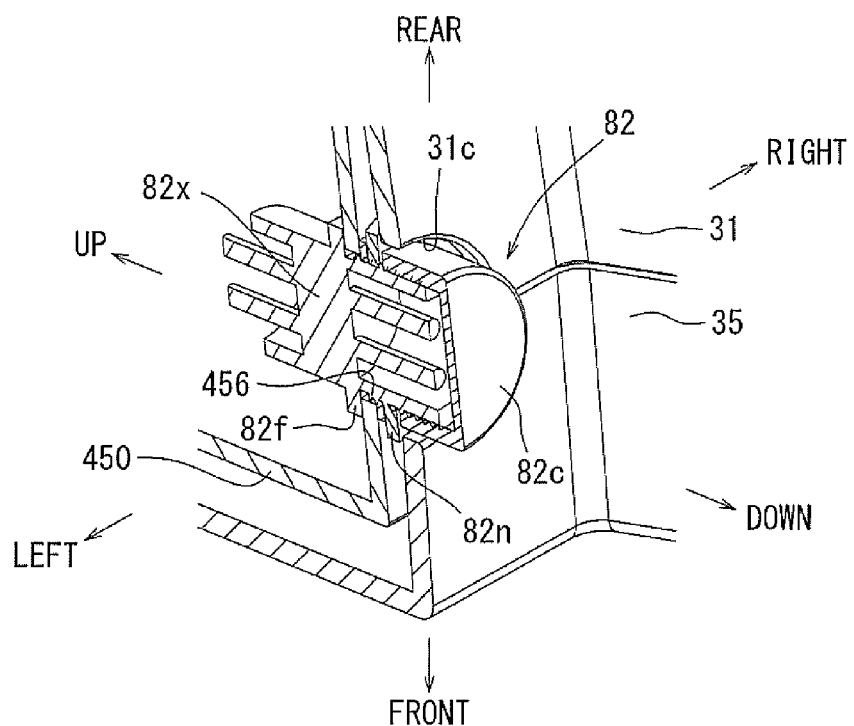
FIG. 21 is a vertical sectional view showing how a connector is attached.

As shown in FIG. 21, the connector opening 456 of the cell housing section 450 of the inner case main body 45 may accommodate the connector 82 of the charging circuit 80. The connector 82 may be a waterproof connector having a cover attached thereto. For example, the connector 82 may include a cover 82c and a connector main body 82x. A ring-shaped flange 82f may be formed at an axially-middle position of the connector main body 82x, and the tips of the flange 82f may extend from the inside of the cell housing section 450 through the connector opening 456. A male screw thread may be formed on an outer circumferential surface of a tip part of the connector main body 82x that protrudes outward from the connector opening 456. A ring-shaped seal material, which may comprise an elastic body, e.g., made of an elastomer (not illustrated), such as a natural or synthetic rubber or a polyurethane, may be located at the tip part of the connector main body 82x, and a locknut (pressing nut) 82n may be screwed onto the male screw thread. In this embodiment, the connector 82 (connector main body 82x) may be attached to the connector opening 456 in a watertight manner. In this state, the tip part of the connector main body 82x protrudes outward from the connector openings 35c and 31c of the outer case 30.

As shown in FIG. 22, the electric wire (line or cord) opening 457 of the cell housing section 450 of the inner case main body 45 allows the output cable 21 to extend or pass from inside the inner case 40 to outside the outer case 30. A waterproof clamp 25 for sealing between the electric wire opening 457 and the output cable 21 may be located in the electric wire opening 457. The waterproof clamp 25 may be a cylindrical member that passes through the electric wire opening 457; it may have a cylindrical portion 25j with a male screw thread formed on an outer circumferential surface thereof and a flange 25f that is coaxially formed at one end of the cylindrical portion 25j. A locknut (pressing nut) 25n may be screwed onto the male screw thread of the cylindrical portion 25j with both the cylindrical portion 25j of the waterproof clamp 25 and the output cable 21 extending through the electric wire opening 457 of the cell housing section 450. Then, the locknut 25n may be fastened such that the flange 25f of the waterproof clamp 25 is brought into press-contact with a circumferential edge of the electric wire opening 457, thereby achieving a seal between the waterproof clamp 25 and the electric wire opening 457.

Housing of Battery Cell Connection Circuits 50 in Inner Case Main Body 45

Figure 23:
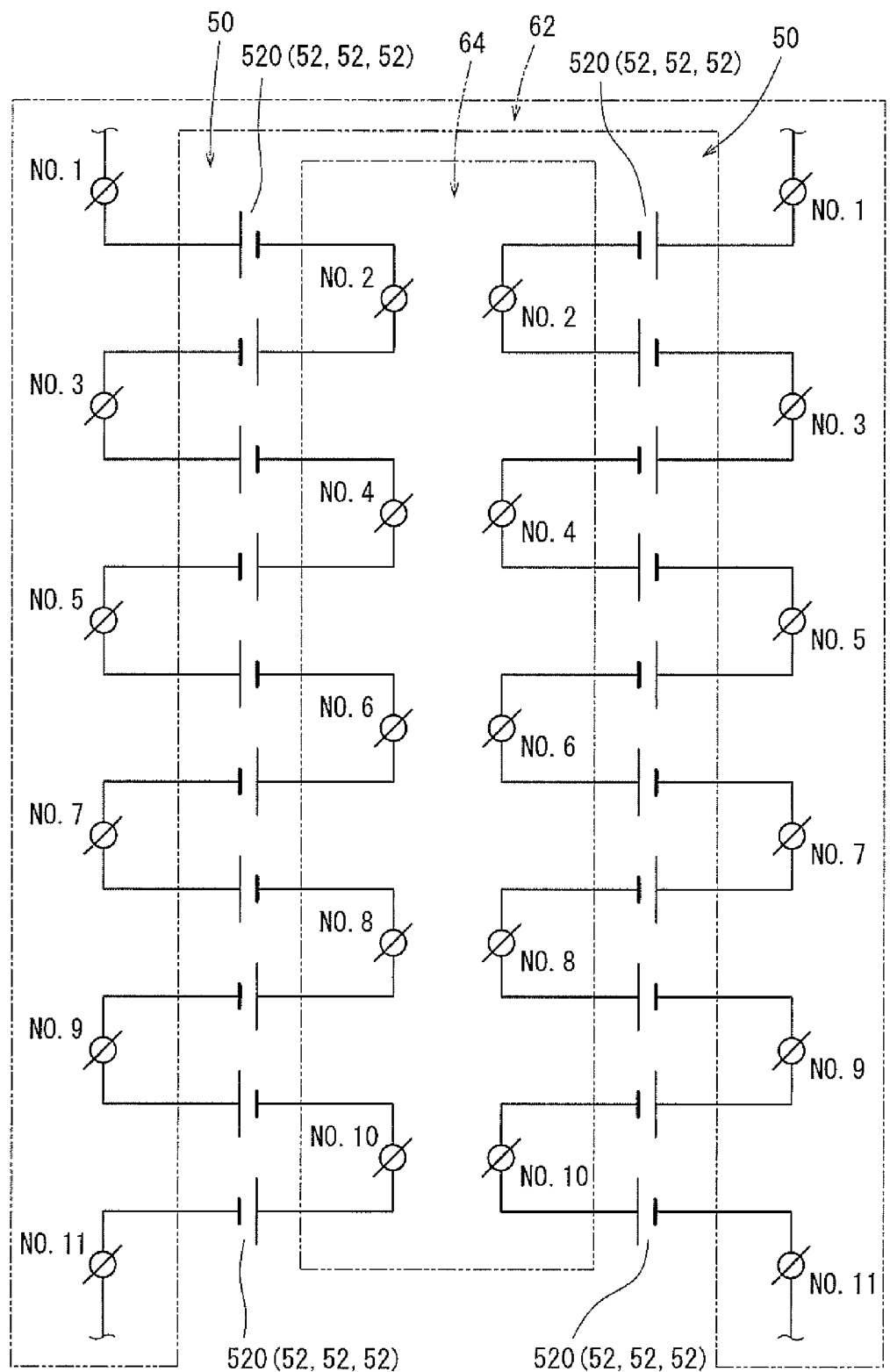
FIG. 23 is a schematic circuit diagram showing electrical connections and the arrangement of the battery cells.
Figure 24:
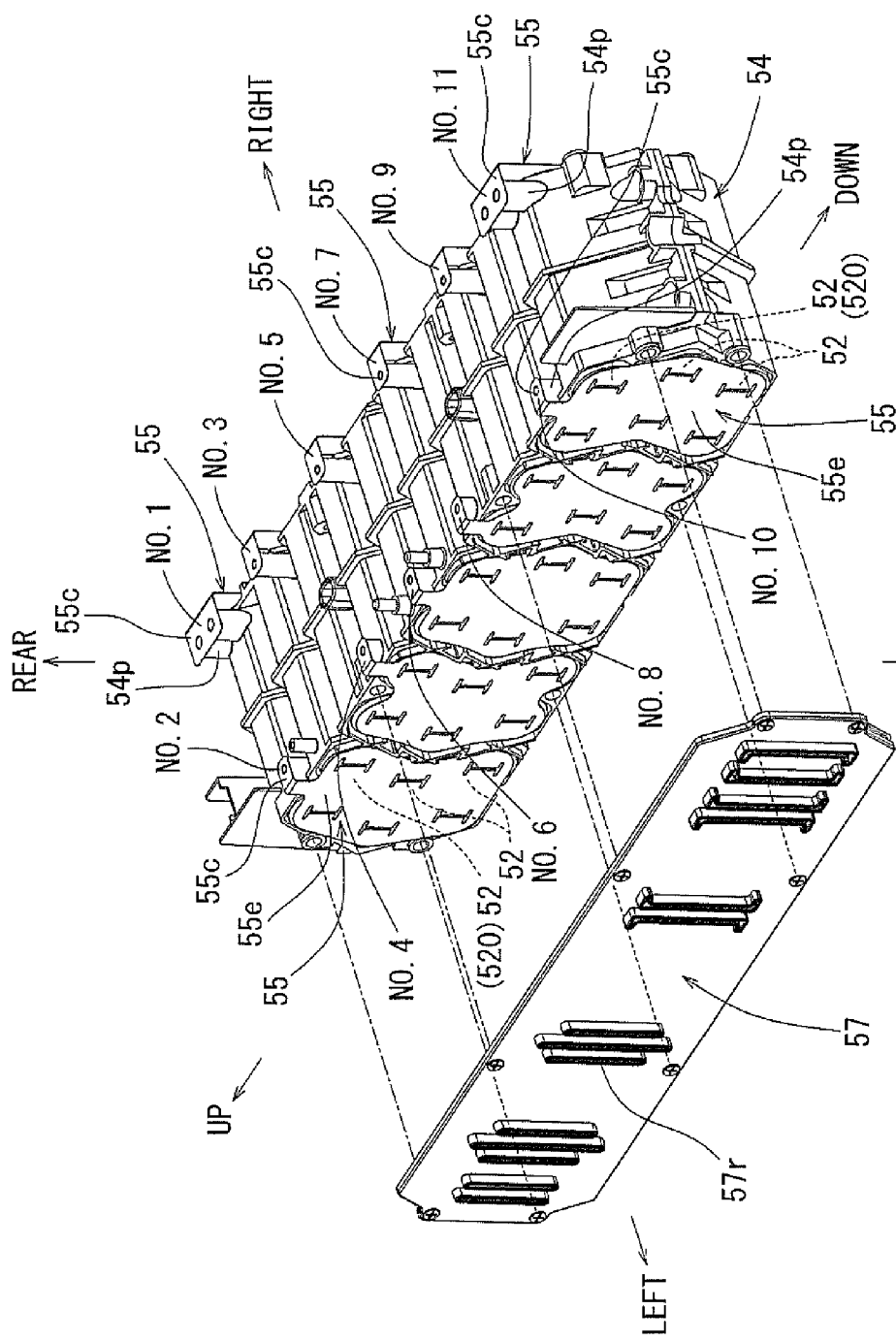
FIG. 24 is an exploded perspective view of a right-side cell holder.
Figure 25:
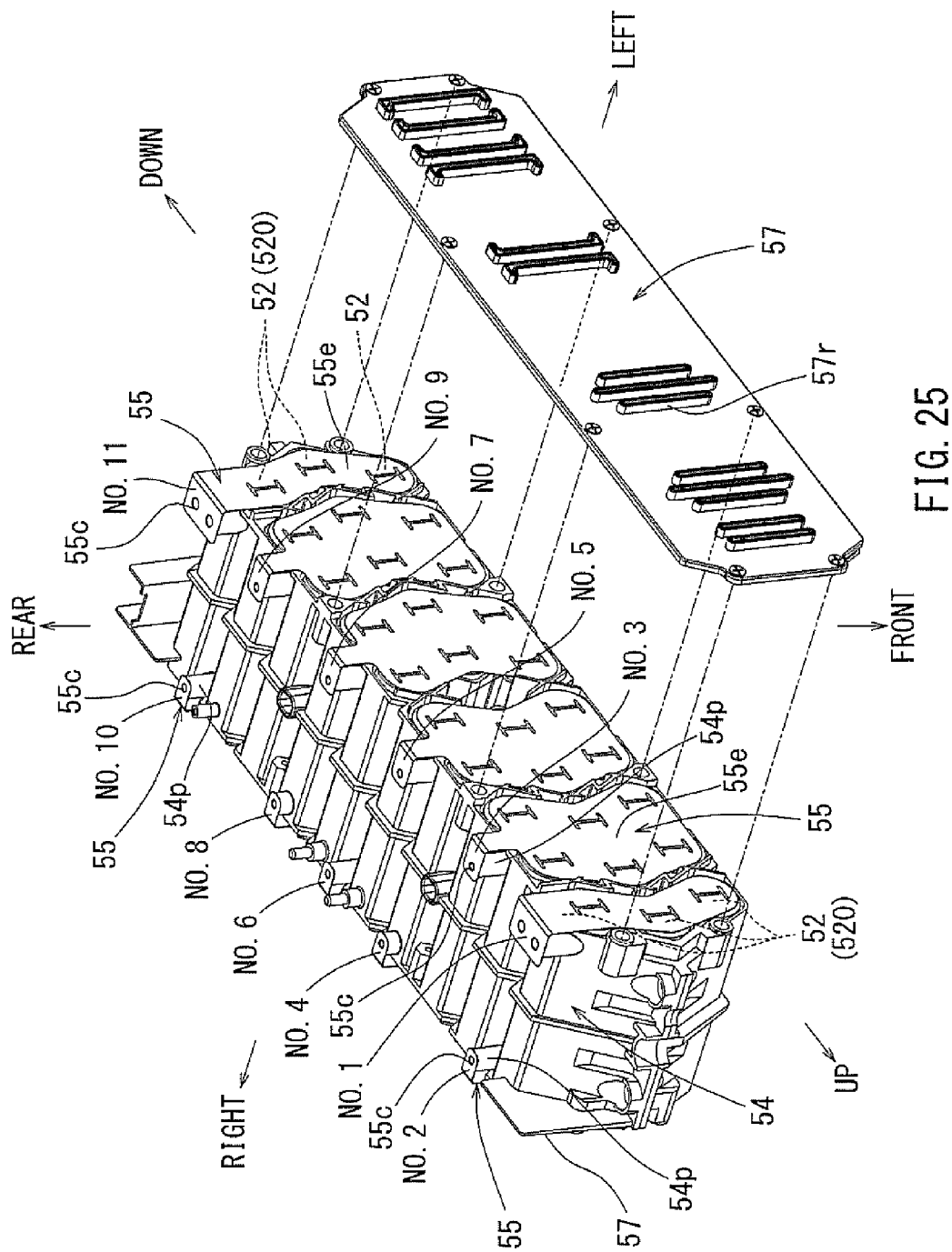
FIG. 25 is an exploded perspective view of a left-side cell holder.

FIG. 23 is a schematic circuit diagram showing the two sets of battery cell connection circuits 50 aligned (matched) with the arrangement of the battery cells 52. In FIG. 23, a single battery cell symbol is utilized to represent each cell assembly 520 even though each cell assembly includes three battery cells 52 connected in parallel. As described above, the ten (10) sets of such cell assemblies 520 may be connected in series with each other. The voltages across the positive electrodes and the negative electrodes of the respective battery cells 52, i.e. the voltages at nodes No. 1 to No. 11, may be supplied (input) to the electric circuit boards 62 and 64 of the protection circuits 60. As shown in FIGS. 24 and 25, the battery cells 52 in each of the respective battery cell connection circuits 50 may be respectively housed in two cell holders 54. Each cell holder 54 may be shaped as a tubular frame that is open on both its left and right sides. The size of the cell holder 54 from the left to the right may be substantially equal to the axial length of the cells 52 (that is, the length of the battery cell 52 between the positive and negative electrodes).

In each cell holder 54, three tiers of the battery cells 52 may be stacked in the front-rear direction (in the up-down direction in FIG. 24), and ten (10) rows of the cell assemblies 520, stacked in three tiers, may be housed in parallel in the up-down direction (longitudinal direction) as shown in FIG. 24. Lead plates 55 may be located on both the left and right sides of the cell holder 54. The lead plates 55 are electrically-conductive flat plates for supplying (inputting) the voltages (voltage signals) of the positive electrodes and the negative electrodes of the respective battery cells 52 to the circuit boards 62 and 64 of the protection circuits 60. The lead plates 55 may include lead plate main body portions 55e welded to the positive electrodes and the negative electrodes of the battery cells 52, and may also include terminals 55c that may protrude rearward (in the upward direction in FIG. 24) from the lead plate main body portions 55e and may be connected to the main circuit board 62 or to the auxiliary circuit board 64. In the case of the lead plates 55 at nodes No. 2 to No. 10, for example, the positive electrodes of the three battery cells 52 and the negative electrodes of the other three battery cells 52 may be connected by welding as shown in FIGS. 23 and 24. In the case of the lead plate 55 at node No. 1, the positive electrodes of the three battery cells 52 may be connected by welding as shown in FIGS. 23 and 25. In the case of the lead plate 55 at node No. 11, the negative electrodes of the three battery cells 52 may also be connected by welding as shown in FIGS. 23 and 25.

Figure 26:
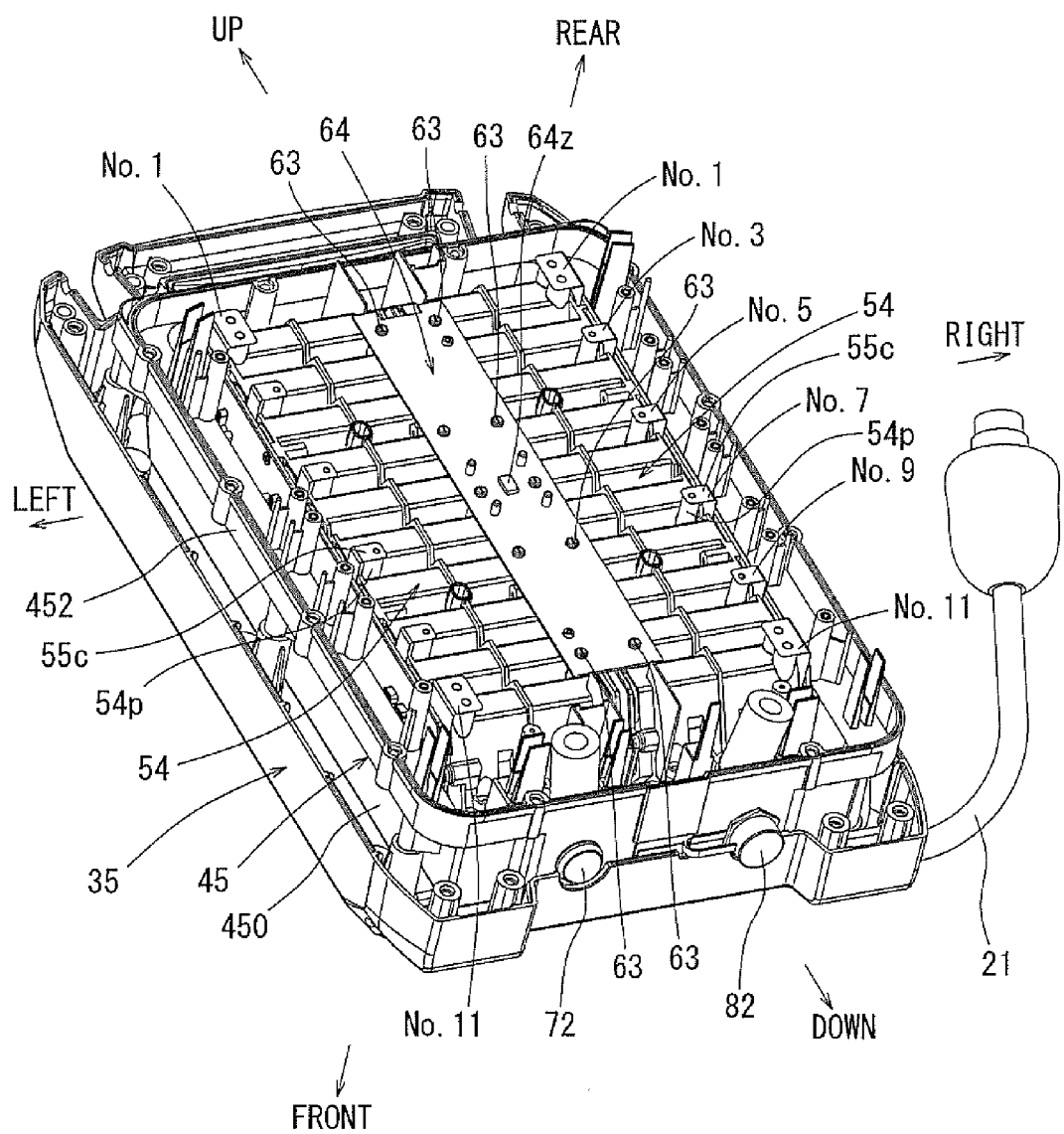
FIG. 26 is a perspective view of the inner case main body housed in the outer case main body, and the cell holders and an auxiliary circuit board housed in the inner case main body.
Figure 28:
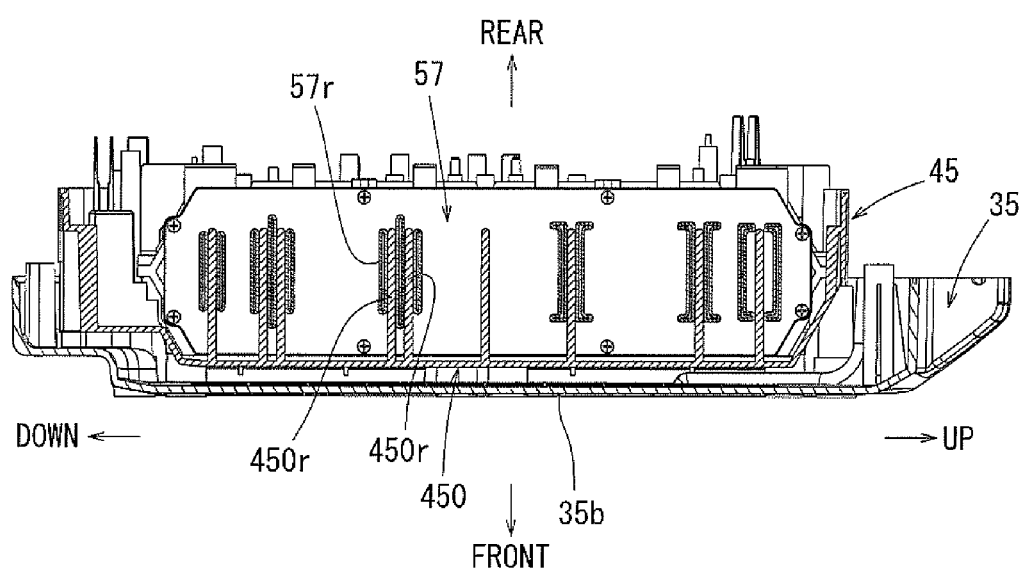
FIG. 28 is a side view showing one of the cell holders fitted into an inner side wall of the inner case main body (cell-housing unit).

When the battery cells 52 are housed in the cell holders 54 and the respective lead plates 55 at nodes No. 1 to No. 11 are connected to the positive and negative electrodes of the battery cells 52, the left and right openings of the cell holders 54 may be covered with side covers 57 as shown in FIGS. 24 and 25. A plurality of ridges (ribs) 57r may extend in the front-rear direction (in the up-down direction in FIG. 24) at predetermined positions on the respective surfaces of the left and right side covers 57. When the two sets of cell holders 54 are housed in the cell housing section 450 of the inner case main body 45 as shown in FIG. 26, the ridges 57r of the right side cover 57 of the left cell holder 54 fit (engage) with the ridges 57r of the left side cover 57 of the right cell holder 54 in an interference fit. As a result, no relative movement of the left and right cell holders 54 in the longitudinal direction (up-down direction) is possible. As shown in FIG. 28, a plurality of vertical ribs 450r fit into the ridges 57r of the side covers 57 of the respective cell holders 54, and are formed on the left and right inner side walls of the cell housing section 450 of the inner case main body 45. As a result, no movement of the left and right cell holders 54 housed in the cell housing section 450 of the inner case main body 45 in the longitudinal direction (up-down direction) and the front-rear direction relative to the cell housing section 450 is possible.

When the left and right cell holders 54 are accommodated in the cell housing section 450 of the inner case main body 45, the lead plates 55 at nodes No. 2, No. 4, No. 6, No. 8, and No. 10 of the left cell holder 54 and the lead plates 55 at nodes No. 2, No. 4, No. 6, No. 8, and No. 10 of the right cell holder 54 are arranged on the cell housing section 450 in the central portion in the left-right direction as shown in the schematic wiring diagram of FIG. 23. In addition, the lead plates 55 at nodes No. 1, No. 3, No. 5, No. 7, No. 9, and No. 11 of the left cell holder 54 may be arranged on the left side of the cell housing section 450. Furthermore, the lead plates 55 at node No. 1, No. 3, No. 5, No. 7, No. 9, and No. 11 of the right cell holder 54 may be arranged on the right side of the cell housing section 450.

Figure 29:
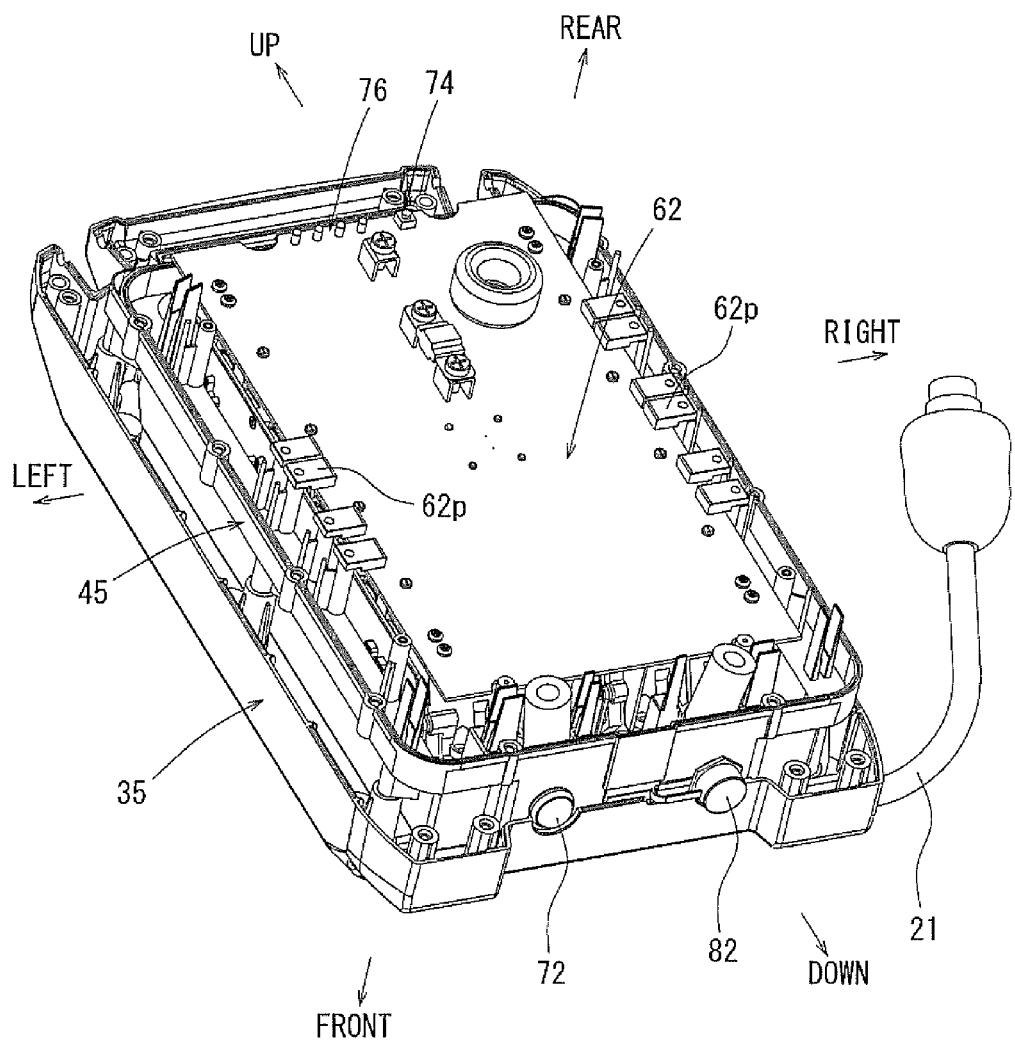
FIG. 29 is a perspective view of the inner case main body housed in the outer case main body and the main circuit board housed in the cell-housing unit of the inner case main body.
Figure 30:
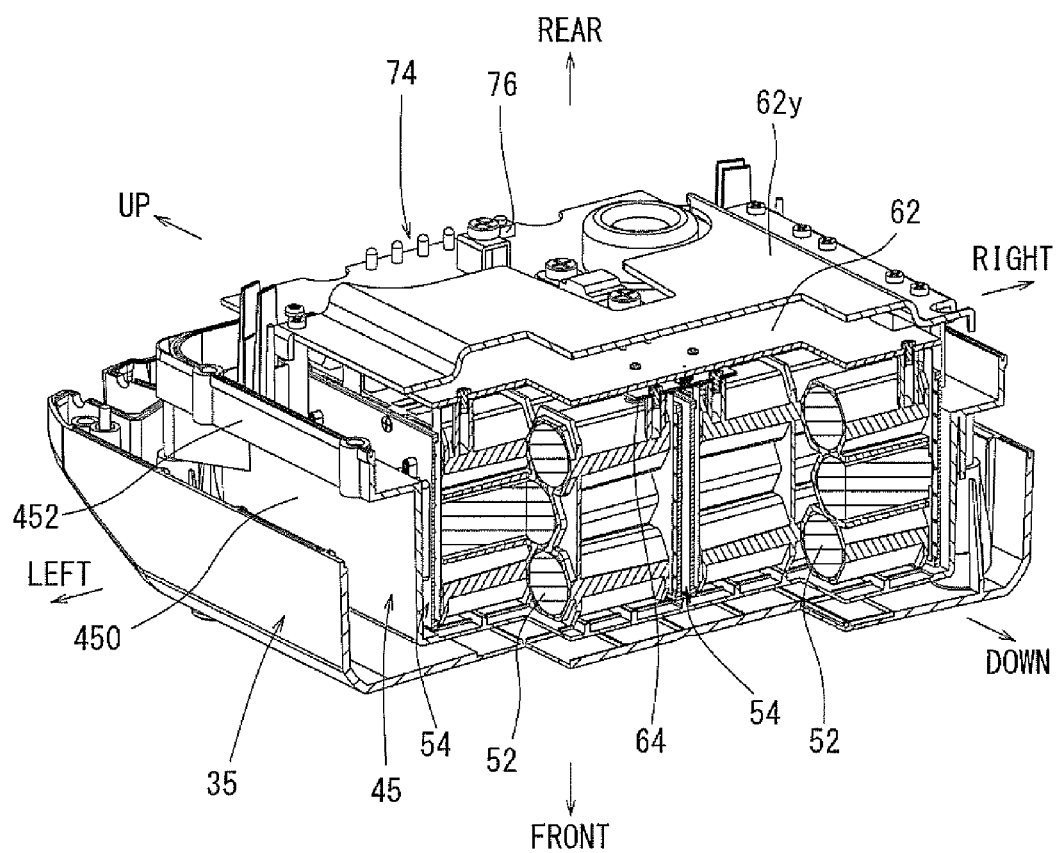
FIG. 30 is a perspective sectional view illustrating the relative arrangement of the cell holders, the auxiliary circuit board, and the main circuit board, etc.
Figure 31:
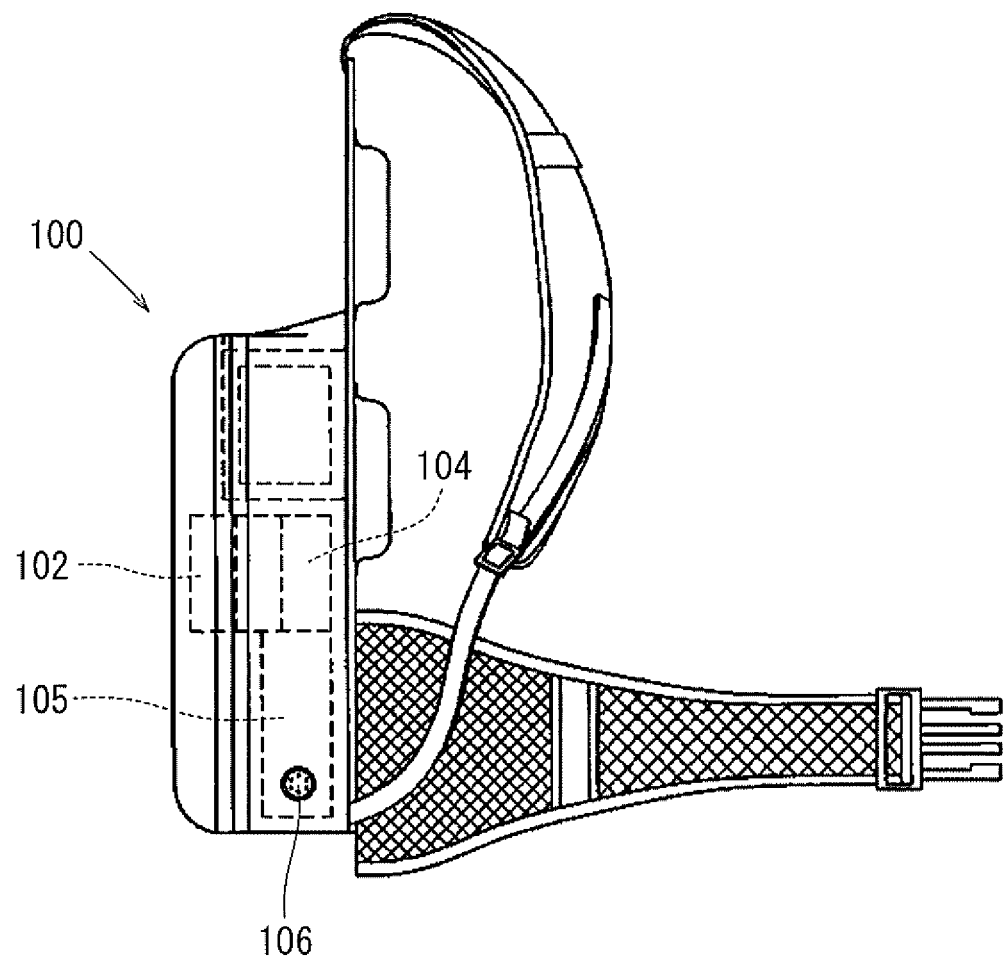
FIG. 31 is a side view illustrating a known electronic power supply device.

As shown in FIG. 26, the auxiliary circuit board 64 of the protection circuit 60 may be arranged or disposed on the left and right lead plates 55 at nodes No. 2, No. 4, No. 6, No. 8, and No. 10 in the central portion of the cell housing section 450. The auxiliary circuit board 64 transmits the voltages (voltage signals), and the temperature signals etc. of the battery cells 52. These signals may be transmitted via the lead plates 55 arranged in the central portion to the main circuit board 62 of the protection circuit 60. As shown in FIG. 26, the auxiliary circuit board 64 may have a strip (elongated) shape, and the width of the auxiliary circuit board 64 preferably corresponds to the arrangement of the left and right lead plates 55 at nodes No. 2, No. 4, No. 6, No. 8, and No. 10. In addition, a signal connector 64z may be connected to a signal connector 62z located at the center on the back surface of the main circuit board 62; the signal connector 64z may be located at the center of the surface of the auxiliary circuit board 64. As shown in FIGS. 29 and 30, the main circuit board 62 of the protection circuit 60 may be arranged or disposed on the lead plates 55 at nodes No. 1, No. 3, No. 5, No. 7, No. 9, and No. 11 at the left and right end portions of the cell housing section 450. The main circuit board 62 may be formed to have a size substantially equal to the area of the cell housing section 450.

In the left and right cell holders 54 shown in FIGS. 24 and 25, respectively, a plurality of columnar circuit board supports 54p may be respectively formed at positions corresponding to the terminals 55c of the respective lead plates 55. As shown in an exemplary, enlarged manner in FIG. 27, each circuit board support 54p of the cell holder 54 is configured to support one terminal 55c of the lead plate 55, as well as the back surface of the main circuit board 62 or the auxiliary circuit board 64, on (at) its tip surface 54s. The height of the circuit board support(s) 54p of the cell holder 54 that support(s) the auxiliary circuit board 64 located at the center position may be smaller by a predetermined size than the height of the circuit board support(s) 54p that support(s) the main circuit board 62 and are located at the left and right ends of the cell holder 54. A nut 54n, to which a screw 63 may be attached to affix the circuit boards 62 and 64, may be inserted into the circuit board support 54p of the cell holder 54. Conductive parts (leads) 62d and 64d of the circuits may be located on the back surface of the main body circuit board 62 or the auxiliary circuit board 64 and may be supported by the circuit board support(s) 54p of the cell holder 54.

Figure 27:
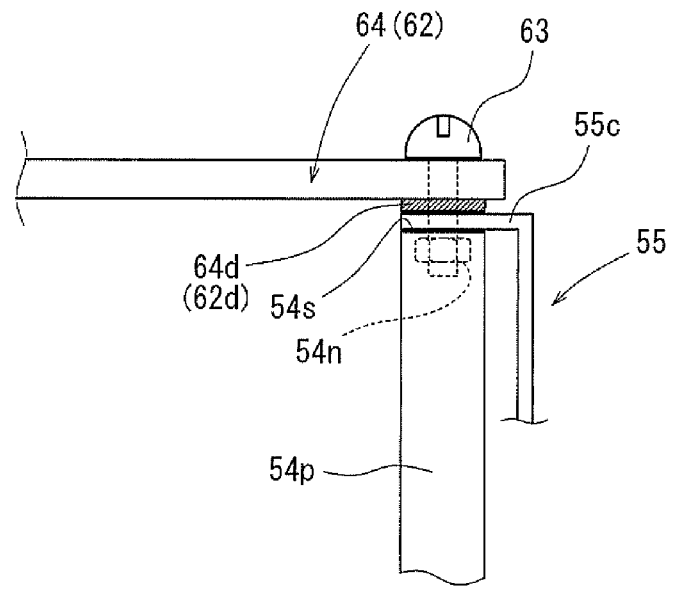
FIG. 27 is an enlarged, detail view showing a fastening structure, using which a terminal of a lead plate of the cell holder is joined to an auxiliary circuit board and a main circuit board.

According to such an embodiment of the present teachings, when the auxiliary circuit board 64 is mounted on the lead plates 55 at nodes No. 2, No. 4, No. 6, No. 8, and No. 10 of the left and right cell holders 54, the terminals 55c of the lead plates 55 are respectively held between the circuit board supports 54p of the cell holders 54 and the auxiliary circuit board 64 as shown in FIG. 27, and the auxiliary circuit board 64 may be screw fastened to the circuit board supports 54p of the cell holders 54. Then, the terminals 55c of the lead plates 55 may be electrically connected to the conductor part(s) 64d of the auxiliary circuit board 64. In other words, the screw(s) 63 and the nut(s) 54n, which is (are) inserted into the circuit board support(s) 54p of the cell holder 54, serve(s) as an exemplary example of a mechanical connecting mechanism according to the present teachings.

As described above, the height of the circuit board support(s) 54p of the cell holder 54 that support(s) the auxiliary circuit board 64 located at the center position may be smaller by a predetermined size than the height of the circuit board support(s) 54p that support(s) the main circuit board 62 and are located at the left and right ends of the cell holder 54. According to such a design, the main circuit board 62 may be mounted on the left and right cell holders 54 so that it is parallel to the auxiliary circuit board 64 after the auxiliary circuit board 64 is mounted on the cell holders 54 as shown in FIG. 30. When the main circuit board 62 is mounted at the outside of the auxiliary circuit board 64, the signal connector 62z of the main circuit board 62 may be connected to the signal connector 64z of the auxiliary circuit board 64 as shown in FIGS. 12 and 13.

When the main circuit board 62 is mounted on the lead plates 55 at nodes No. 1, No. 3, No. 5, No. 7, No. 9, and No. 11 of the left and right cell holders 54, the terminals 55c of the lead plates 55 are respectively held between the circuit board supports 54p of the cell holders 54 and the main circuit board 62 as shown in FIG. 27. The main circuit board

62 may then be screw fastened to the circuit board supports 54*p* of the cell holders 54. Then, the terminals 55*c* of the lead plates 55 may be electrically connected to the conductor part(s) 62*d* of the main circuit board 62. As described above, the voltages (voltage signals) of the lead plates 55 at nodes No. 2, No. 4, No. 6, No. 8, and No. 10, which are arranged or disposed in the central portion of the cell housing section 450, may be transmitted to the main circuit board 62 via the auxiliary circuit board 64. As a result, there is no need to provide a connecting portion for the lead plates 55 at nodes No. 2, No. 4, No. 6, No. 8, and No. 10 in the central part of the main circuit board 62. Accordingly, it is possible to simplify the circuit design of the main circuit board 62.

Figure 16:
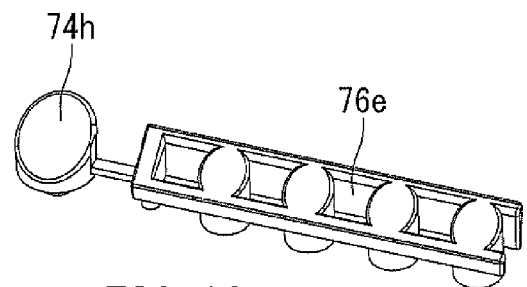
FIG. 16 is a perspective view showing a lens (illuminating device) for displaying the remaining battery capacity and a push button, which are attachable to the inner case cover.

As shown in FIG. 2, the two sets of protection circuits 60 may be located in (on) the main circuit board 62. Also, the control microcomputer 70 for controlling the protection circuits 60 may be mounted on the main circuit board 62. As shown in FIGS. 29 and 30, the switch 74 for activating the display of the remaining battery capacity and the LED display unit 76 may be located on the main circuit board 62. The switch 74 and the LED display unit 76 may be located at a center position of the upper part of the main circuit board 62. As shown in FIG. 15, the push button 74*h* may be located at the top plate of the inner case cover 41 (outer case cover 31) of the inner case 40 corresponding to the switch 74, and a lens or window 76*e* for displaying the remaining battery capacity may be located at a position corresponding to the LED(s) of the LED display unit 76. As shown in FIG. 16, the push button 74*h* and the lens 76*e* may be integrally molded by using a flexible resin and may be fitted into an opening located at (in) the top plate of the inner case cover 41 (outer case cover 31) of the inner case 40. As shown in FIG. 29, the plurality of FETs 62*p* in the protection circuits 60 may be located at the left and right ends of the main circuit board 62. Furthermore, as shown in FIGS. 12 and 13, a heat sink 62*y* for cooling the FETs 62*p* may extend in a spaced relation over the main circuit board 62 with the heat sink 62*y* contacting the surfaces of the FETs 62*p*. In other words, the FETs 62*p* may be held between the main circuit board 62 and the radiator plate (heat sink) 62*y*.

Advantages of Electronic Power Supply Devices 10 According to the Present Teachings Electronic power supply devices 10 according to the present teachings may be configured such that the battery cells 52 are housed in the waterproof inner case 40 and such that the inner case 40 is housed in the outer case 30, thereby better protecting the battery cells 52 against the ingress of water, moisture, debris, etc. Accordingly, such electronic power supply devices 10 may be used outdoors regardless of the weather. In addition or in the alternative, the inner case main body 45 may be positioned such that the direction of the inner case main body opening and the direction of the outer case main body opening are the same. The number of the mating (alignment) positions may be two, which may be described as a double structure. In more detail, the two may correspond to the mating positions 41*a* and 45*a* of the inner case main body 45 and the inner case cover 41, and the mating positions 31*a* and 35*a* of the outer case main body 35 and the outer case cover 31. Further, the mating positions 41*a* and 45*a* may be configured to match or be aligned with the mating positions 31*a* and 35*a* in the depth direction, or they may be positioned inside the outer case cover 31, that is, they may be offset in the depth direction. In other words, the junction between the inner case main body 45 and the inner case cover 41 may be aligned with or offset from the junction between the outer case main body 35 and the outer case cover 31. According to such a design, if the mating positions are offset, even if water (or moisture, debris, etc.) enters into the outer case 30 through (from) the mating positions 31*a* and 35*a* of the outer case 30, such water, etc. may not easily fall onto (reach) the mating positions 41*a* and 45*a* of the inner case 40. Consequently, the battery cells of the electronic power supply device and the water-sensitive components of the electric circuit may be better protected from exposure to water or other corroding influences, even when the electronic power supply device is used outdoors in the rain or other inclement conditions.

In addition or in the alternative, the protrusions 41*a* that may be continuously formed at (along) the mating positions of the inner case cover 41 and the groove portions 45*a* that may be continuously formed at (along) the mating positions of the inner case main body may be fitted into each other such that the inner case main body 45 and the inner case cover 41 may be aligned and mated (joined) in a watertight manner. According to such a design, a packing member (gasket or seal) such as an O-ring may not be required at the mating positions of the inner case cover 41 and the inner case main body 45. Thus, the number of components (i.e. the part count) may be reduced, thereby reducing manufacturing costs. In addition or in the alternative, the electric wire (line or cord) openings 457 and 35*j* for the passage of the output cable 21 may be formed in the inner case 40 and the outer case 30. In order to provide a seal between the electric wire opening 457 of the inner case main body 45 of the inner case 40 and the output cable 21, the waterproof clamp 25, which may be made of an elastic member, may be provided. According to such a design, water, etc. may be prevented or impeded from entering into the inner case 40 along the output cable 21.

The switch openings 455, 31*s*, and 35*s*, to which the (waterproof) main switch 72 is attached, may be formed with portions in the inner case 40 and portions in the outer case 30. In order to provide a seal between the switch opening 455 of the inner case main body 45 of the inner case 40 and the main switch 72, a sealing material (elastic member) may surround the main body shaft portion 72*j* of the main switch 72. According to such a design, an improved seal at the switch-attached part of the inner case main body 45 of the inner case 40 may be achieved. In addition, the connector openings 456, 31*c*, and 35*c* may be formed at portions of the inner case 40 and the outer case 30 where the waterproofing connector 82 is attached. In order to provide a seal between the connector opening 456 of the inner case 40 and the connector 82, a sealing material (elastic member) may surround the connector 82, thereby providing an effective seal.

As shown in FIG. 26, the left and right cell holders 54 may be configured to fit into or engaged (interference fit) with each other such that the two cell holders 54 can not move relative to each other when the cell holders 54 are housed in the inner case main body 45. Furthermore, when the cell holders 54 are housed in the inner case main body 45, the cell holders 54 and the inner wall surface of the inner case main body 45 may be fitted into or engaged (interference fit) with each other so as to be fixed relative to each other. Accordingly, even if the electronic power supply device 10 is violently moved or impacted (e.g., dropped), the battery cells 52 are better prevented or impeded from moving relative to the inner case main body 45 due to their own weight (inertia), and damage to the auxiliary circuit board 64, and the main circuit board 62 etc. may be prevented or at least minimized.

In some embodiments of the electronic power supply device 10 of the present teachings, the outer case 30 may be made of resin (plastic) and may be flexible. The support(s) for the outer case 30 that support(s) the inner case 40 in which the battery cells 52 are housed, that is, the top plate of the outer case cover 31 and the six pillars 353 of the outer case main body 35, may be located at positions other than at the corner portions of the outer case 30. According to such a design, the support(s) that hold or support the inner case 40 and ribs etc. need not be located at the corner portions of the outer case 30. Instead, there may be the hollow space S at those locations. According to such a design, even if the electronic power supply device 10 is dropped and the corner portions of the outer case 30 forcibly collide with a hard surface, the corner portions of the outer case 30 may deflect, bend or collapse to some extent, thereby absorbing at least a portion of the shock or impact energy. Since the deflection (bending) of the corner portions of the outer case 30 may be absorbed by the space S, it may be possible to prevent that the impact applied to the corner portions of the outer case 30 is directly transmitted or applied to the inner case 40. According to such a design, the impact force experienced by the battery cells 52 housed in the inner case 40 may be reduced or eliminated.

The support(s) for the outer case 30 for supporting the inner case 40 may be located at positions other than at or along the side wall of the outer case 30 where the mating positions 31a and 35a of the outer case main body 35 and the outer case cover 31 are located. According to such a design, the side wall(s) of the outer case 30 and the side wall(s) of the inner case 40 need not be connected to each other, and the space S may be defined, at least between the side wall(s) of the outer case 30 and the side wall(s) of the inner case 40. Consequently, if the electronic power supply device 10 is dropped or otherwise impacted and the side wall(s) of the outer case 30 deflect(s), bend(s) or collapse(s) due to the impact, the deflection (bent material) may be absorbed or accommodated in the space S such that the inner case 40 is not directly impacted or damaged. In addition or in the alternative, the battery cells 52 may be housed in the inner case 40 such that a wide or large space is provided in the inner case cover 41. According to such a design, if the inner case cover 41 of the inner case 40 deflects, bends or collapses due to an impact, it may possible to prevent or reduce damage to the battery cells 52 in the inner case 40 as a result of the deflection or bending of the inner case cover 41. In addition or in the alternative, the main circuit board 62 and the auxiliary circuit board 64 of the protection circuits 60 for monitoring the voltage of the cells 52, as well as the heat sink 62y for dissipating the heat of the FETs 62p on the main circuit board 62, may be housed in the inner case 40 together with the battery cells 52. For example, the heat sink 62y may be located on the side of the inner case cover 41. According to such a design, if the inner case cover 41 of the inner case 40 deflects, bends or collapses due to an impact, at least a portion of the impact (impact energy) may be absorbed by the heat sink 62y since the inner case cover 41 can bend and then abut against the heat sink 62y, which may also bend or deflect, thereby dissipating a portion of the impact energy in the heat sink 62y.

Optional Modifications of the Present Teachings

The present invention is not limited to the above-described embodiments and may be further modified without departing from the scope and spirit of the present teachings. For example, in the above-described embodiments, the inner case main body 45 of the inner case 40 is housed in the outer case main body 35 of the outer case 30 such that the direction of the openings of the inner case main body 45 and the outer case main body 35 are the same. However, the inner case main body 45 of the inner case 40 may instead be housed such that the direction of the opening of the inner case main body 45 may be, for example, orthogonal to that of the outer case main body 35 of the outer case 30. In addition or in the alternative, in the above-described embodiments, the protrusions 41a are formed at the mating positions of the inner case cover 41 of the inner case 40 and the grooves 45a that receive the protrusions 41a are formed at the mating positions of the inner case main body 45. However, the protrusions may instead be formed at the mating positions of the inner case main body 45 and the grooves may be formed at the mating positions of the inner case cover 41. One or more of the protrusions 41a and the groove portions 45a may be formed as an elastic body, e.g., made from an elastomer, such as, e.g., a natural or synthetic rubber or a polyurethane.

In addition or in the alternative, in the above-described embodiments, the inner case cover 41 and the outer case cover 31 are integrally molded such that the top plate of the inner case cover 41 of the inner case 40 and the top plate of the outer case cover 31 of the outer case 30 are common to each other. However, a space may instead be formed between the top plate of the inner case cover 41 and the top plate of the outer case cover 31, and the inner case cover 41 may be supported by a plurality of pillars formed inside the outer case cover 31. In addition or in the alternative, in the above-identified embodiments, the inner case main body 45 of the inner case 40 is supported by the six pillars 353 located in the outer case main body 35 of the outer case 30. However, the bottom plate of the outer case main body and the bottom plate of the inner case main body 45 may be joined to each other without using the pillars 353 located in the outer case main body 35. For example, the bottom plate of the outer case main body 35 and the bottom plate of the inner case main body 45 may be integrated (integral) with each other.

In the above-identified embodiments, the electric blower 3 was described as a representative example of an electronic power equipment according to the present teachings. However, other types of electronic power equipment according the present teachings comprise, without limitation, electric power tools, such as electric circular saws, electric drills (e.g., driver drills), electric screwdrivers, electric reciprocating (recipro) saws, electric grinders, electric hammers, etc., as well as outdoor power equipment, such as electric hedge trimmers, electric brush cutters, electric lawn mowers, electric chain saws, electric string trimmers, electric power cutters, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electronic power supply devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Depending on design requirements, exemplary embodiments of the control microcomputer 70 of the present disclosure may be implemented in hardware and/or in software. The implementation can be configured using a digital storage medium, for example one or more of a ROM, a PROM, an EPROM, an EEPROM, a flash memory, etc., on which electronically readable control signals (program code) are stored, which interact or can interact with a programmable hardware component to execute programmed functions.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA). A microprocessor is a typical component of a control microcomputer according to the present teachings.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods or functions described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the control microcomputer 70 or a "controller", are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods or function during its performance, for example, such that the program reads storage locations and/or writes one or more data elements into these storage locations, wherein switching operations or other operations are induced in transistor structures, in amplifier structures, or in other electrical, electronic, optical, magnetic components, or components based on another functional or physical principle. Correspondingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing in one or more storage locations, as well as control other apparatuses, machines, and components, and thus for example also perform any complex process that the electronic power equipment may be designed to perform.

What is claimed is:

1. An electronic power supply device for supplying electric power from a plurality of battery cells to an electronic power equipment, comprising:
    a waterproof inner case configured to house the plurality of battery cells; and
    an outer case housing the inner case;
   wherein:
    the inner case includes an inner case main body having a bottom plate and at least one side wall extending substantially perpendicularly from the bottom plate, the inner case main body defining an opening, and an inner case cover that covers the opening of the inner case main body;
    the outer case includes an outer case main body having an opening and an outer case cover that covers the opening of the outer case main body; and
    the inner case main body is housed in the outer case main body such that the opening of the inner case main body faces in a same direction as the opening of the outer case main body.

2. An electronic power supply device for supplying electric power from a plurality of battery cells to an electronic power equipment, comprising:
    an inner case configured to house the plurality of battery cells; and
    an outer case housing the inner case,
   wherein:
    the inner case includes an inner case main body having a bottom plate and at least one side wall extending substantially perpendicularly from the bottom plate, the inner case main body defining an opening, and an inner case cover that covers the opening of the inner case main body;
    the outer case includes an outer case main body having an opening and an outer case cover that covers the opening of the outer case main body; and
    the inner case main body is housed in the outer case main body such that the opening of the inner case main body faces in a same direction as the opening of the outer case main body.

3. The electronic power supply device according to claim 2, wherein:
    a mating position of the inner case main body with the inner case cover is aligned with a mating position of the outer case main body with the outer case cover in a depth direction of the electronic power supply device, or the mating position of the inner case main body with the inner case cover is positioned inside the outer case cover.

4. The electronic power supply device according to claim 2, further comprising:
    at least one protrusion continuously extending along the mating position of either of the inner case main body or the inner case cover;
    at least one groove engaging the at least one protrusion and continuously extending along the mating position of the other of the inner case main body and the inner case cover;
    wherein the inner case main body is mated with the inner case cover via the engagement of the at least one protrusion in the at least one groove.

5. The electronic power supply device according to claim 1, further comprising:
an electric circuit board housed in the inner case and comprising at least one battery cell protection circuit.

6. The electronic power supply device according to claim 5, further comprising:
a heat sink housed in the inner case and configured to dissipate heat from at least one electronic component mounted on the electric circuit board.

7. An electronic power supply device for supplying electric power from a plurality of battery cells to an electronic power equipment, comprising:
an inner case configured to house the plurality of battery cells; and
an outer case housing the inner case, the electronic power supply device further comprising:
an opening configured to receive an electric wire and having a first portion defined by the inner case and a second portion defined by the outer case; and
a sealing member disposed between the electric wire and the first and second portions of the opening.

8. The electronic power supply device according to claim 1, further comprising:
a switch opening defined to receive a switch and having a first portion defined by the inner case and a second portion defined by the outer case; and
a sealing member is disposed between the switch and the first and second portions of the switch opening.

9. The electronic power supply device according to claim 1, further comprising:
a connector opening configured to receive a connector and having a first portion defined by the inner case and a second portion defined by the outer case; and
a sealing member is disposed between the connector and the first and second portions of the connector opening.

10. The electronic power supply device according to claim 2, wherein:
the inner case cover and the outer case cover are integrally formed with a common top plate;
the inner case is affixed to the outer case cover of the outer case by mating the inner case with the inner case cover and screw fastening the inner case to the inner case cover; and
the outer case main body is mated with and screw fastened to the outer case cover, and is also screw fastened to the inner case main body.

11. The electronic power supply device according to claim 1, further comprising:
a plurality of battery cell holders, each housing a subset of the plurality of battery cells, the battery cell holders being housed in the inner case such that adjacent cell holders are engaged with each other and are not movable relative to each other at least in a longitudinal direction of the battery cell holders;
wherein the plurality of battery cell holders are housed in the inner case such that the battery cell holders also are not movable relative to an inner wall surface of the inner case at least in the longitudinal direction of the battery cell holders.

12. The electronic power supply device according to claim 1, further comprising:
a support of the outer case that supports the inner case and is located at an area of the outer case that is spaced away from a corner portion of the outer case;
wherein the support of the outer case that supports the inner case also is located at a position that is spaced away from a side wall of the outer case where the outer case main body is mated with the outer case cover.

13. The electronic power supply device according to claim 12, wherein:
the inner case cover and the outer case cover are integrally formed such that a top plate of the inner case cover is connected to a top plate of the outer case cover.

14. The electronic power supply device according to claim 12 wherein:
the side wall of the outer case and a side wall of the inner case are parallel to each other at a position that is spaced away from the corner portions of the outer case and
the side wall of the outer case at the corner portions of the outer case is spaced farther apart from the side wall of the inner case, the corner portions of the outer case being non-parallel to the side wall of the inner case.

15. The electronic power supply device according to claim 12, wherein:
a gap between the side wall of the outer case and the side wall of the inner case at the corner portions of the outer case is larger than that a gap at a position other than the corner portions of the outer case.

16. The electronic power supply device according to claim 12, wherein:
the side wall of the inner case at the corner portions is arc shaped; and
a gap between the arc-shaped side wall of the inner case and the side wall of the outer case is larger than that a gap between the side wall of the inner case other than the corner portions and the side wall of the outer case.

17. The electronic power supply device according to claim 12, further comprising the plurality of battery cells, wherein the battery cells are housed in the inner case such that there is a hollow space defined between the battery cells and the inner case cover.

18. The electronic power supply device according to claim 17, further comprising:
a circuit board comprising at least one battery cell protection circuit configured to monitor the voltages of the battery cells, and a heat sink configured to dissipate heat from at least one electronic component mounted on the circuit board,
wherein the heat sink is located between the battery cells and the inner case cover.

19. The electronic power supply device according to claim 7, wherein the inner case is waterproof.

20. The electronic power supply device according to claim 2, further including:
a harness comprising a shoulder belt and a waist belt;
a back surface plate connected to the harness and to the outer case, the back surface plate being configured to support the outer case on an operator's back when the harness is worn by the operator;
a flexible electric cable extending from an interior of the electronic power supply device to an exterior of the outer case; and
an adapter attached to an exterior end of the electric cable, the adapter being configured to physically and electrically connect the electric cable to the electronic power equipment.

21. The electronic power supply device according to claim 20, wherein:
the inner case and the outer case are formed of plastic;
the electronic power supply device further comprises: at least one protrusion that continuously extends along the mating position of either of the inner case main body or the inner case cover, and at least one groove that engages the at least one protrusion and continuously extends along the mating position of the other of the inner case main body and the inner case cover;

the inner case main body is mated with the inner case cover via the engagement of the at least one protrusion in the at least one groove;

the inner case further comprises a plurality of battery cell holders, each housing a subset of the plurality of battery cells, the battery cell holders being housed in the inner case such that adjacent cell holders are engaged with each other and are not movable relative to each other at least in a longitudinal direction of the battery cell holders; and the plurality of battery cell holders are housed in the inner case such that the battery cell holders are not movable relative to an inner wall surface of the inner case at least in the longitudinal direction of the battery cell holders.

* * * * *